(12) United States Patent
Francis

(10) Patent No.: US 11,193,615 B1
(45) Date of Patent: Dec. 7, 2021

(54) MULTI-ANNULI PIPE FITTING SYSTEMS AND METHODS

(71) Applicant: Trinity Bay Equipment Holdings, LLC, Houston, TX (US)

(72) Inventor: Kirk Spencer Francis, Richmond, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/184,923

(22) Filed: Feb. 25, 2021

(51) Int. Cl.
| F16L 11/08 | (2006.01) |
| F16L 13/14 | (2006.01) |
| F16L 33/01 | (2006.01) |
| F16L 39/02 | (2006.01) |

(52) U.S. Cl.
CPC ............ *F16L 33/01* (2013.01); *F16L 11/083* (2013.01); *F16L 13/142* (2013.01); *F16L 39/02* (2013.01)

(58) Field of Classification Search
CPC ....... F16L 33/01; F16L 11/083; F16L 13/142; F16L 11/02; F16L 11/08; F16L 11/20; F16L 33/22; F16L 33/23; F16L 33/26; F16L 11/12; F16L 33/28; F16L 39/005; F16L 39/02; F16L 11/22
USPC ............ 285/222.1, 382, 222.2, 222.3, 222.4, 285/222.5
See application file for complete search history.

(56) References Cited

U.S. PATENT DOCUMENTS

| 4,063,757 A | 12/1977 | Fuhrmann | |
| 4,109,943 A | 8/1978 | Cooke | |
| 6,039,083 A | 3/2000 | Loper | |
| 6,866,302 B2 * | 3/2005 | Furata | F16L 33/01 285/222.1 |
| 9,546,751 B2 | 1/2017 | Roberts et al. | |
| 9,618,419 B2 | 4/2017 | Demanze et al. | |
| 9,625,070 B2 | 4/2017 | Hegler et al. | |
| 9,921,127 B2 | 3/2018 | Clevelario | |
| 10,184,603 B2 | 1/2019 | Hegler et al. | |
| 2002/0190522 A1 * | 12/2002 | Grepaly | F16L 33/01 285/222.1 |

(Continued)

FOREIGN PATENT DOCUMENTS

| CN | 201386876 Y | 1/2010 |
| DE | 10351997 A1 | 6/2005 |

(Continued)

*Primary Examiner* — Matthew Troutman
*Assistant Examiner* — William S. Choi
(74) *Attorney, Agent, or Firm* — Conrad J. Hsu

(57) ABSTRACT

Techniques for implementing a pipeline system that includes a segment and a pipe fitting. The pipe segment includes an inner barrier layer, a first intermediate layer in an inner tubing annulus, an intermediate barrier layer disposed around the inner tubing annulus, a second intermediate layer in an outer tubing annulus, and an outer barrier layer disposed around the outer tubing annulus. The pipe fitting includes a fitting body that defines a fitting bore, a fitting jacket secured to the fitting body to define a tubing cavity, in which the fitting jacket is conformally deformed around the outer barrier layer of the pipe segment, and an annulus divider ring secured to the fitting jacket to divide the tubing cavity into an outer fitting annulus and an inner fitting annulus, in which the annulus divider ring is conformally deformed around the intermediate barrier layer of the pipe segment.

10 Claims, 8 Drawing Sheets

(56) References Cited

U.S. PATENT DOCUMENTS

| | | |
|---|---|---|
| 2011/0132059 A1* | 6/2011 | Gleim |
| 2012/0160536 A1* | 6/2012 | Beining .................. F16L 33/01 |
| 2014/0261839 A1* | 9/2014 | Pelletier .................. F16L 39/02 |
| 2016/0076684 A1 | 3/2016 | Coutts et al. |
| 2016/0090718 A1* | 3/2016 | Zhang .................. F16L 39/005 |
| 2018/0283588 A1 | 10/2018 | Gray et al. |
| 2019/0226615 A1 | 7/2019 | Wu et al. |

FOREIGN PATENT DOCUMENTS

| | | |
|---|---|---|
| EP | 3314155 B1 | 5/2018 |
| EP | 3408571 B1 | 11/2019 |
| FR | 3076340 A1 | 2/2020 |
| GB | 610426 A | 10/1948 |
| GB | 777118 A | 6/1957 |

\* cited by examiner

MULTI-ANNULI PIPE FITTING SYSTEMS AND METHODS

BACKGROUND

The present disclosure generally relates to pipeline systems and, more particularly, to a pipe fitting that includes multiple fitting annuli.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate transporting fluid, a pipeline system generally includes one or more pipe segments in addition to pipe (e.g., midline and/or end) fittings, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may isolate (e.g., insulate) fluid being conveyed within the pipe bore of the pipe segment from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

To facilitate improving fluid isolation, in some instances, the tubing of a pipe segment may include multiple layers. For example, the tubing of a pipe segment may include an inner barrier (e.g., liner or sheath) layer and an outer barrier (e.g., shield or sheath) layer that each run (e.g., span) the length of the pipe segment. To improve its tensile strength and/or its hoop strength, the tubing of the pipe segment may additionally include one or more reinforcement layers, which are implemented between the inner barrier layer and the outer barrier layer using solid material that has a higher tensile strength and/or a higher linear elasticity modulus (e.g., stiffness) as compared to the inner barrier layer and/or the outer barrier layer. However, even when implemented as a continuous solid layer, some amount of fluid (e.g., gas and/or liquid) may nevertheless gradually permeate from a pipe bore of a pipe segment through its inner barrier layer and/or from environmental conditions external to the pipe segment through its outer barrier layer and contact material in one of more of its reinforcement layers, which, at least in some instances, may potentially affect (e.g., reduce) tensile strength and/or hoop strength of the pipe segment, for example, due to the permeated fluid corroding the solid material in the one or more reinforcement layers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipeline system includes a multi-annuli pipe segment and a multi-annuli pipe fitting secured to the multi-annuli pipe segment. The multi-annuli pipe segment includes an inner barrier layer that defines a pipe bore, a first intermediate layer that defines a first fluid conduit in an inner tubing annulus implemented around the inner barrier layer, an intermediate barrier layer disposed around the inner tubing annulus, a second intermediate layer that defines a second fluid conduit in an outer tubing annulus implemented around the intermediate barrier layer, and an outer barrier layer disposed around the outer tubing annulus. The multi-annuli pipe fitting includes a fitting body that defines a fitting bore fluidly connected to the pipe bore of the multi-annuli pipe segment, a fitting jacket secured to the fitting body to define a tubing cavity, in which the fitting jacket is conformally deformed around the outer barrier layer of the multi-annuli pipe segment to facilitate securing the multi-annuli pipe fitting to the multi-annuli pipe segment, and an annulus divider ring secured to the fitting jacket to divide the tubing cavity into an outer fitting annulus that is fluidly connected to the outer tubing annulus of the multi-annuli pipe segment and an inner fitting annulus that is fluidly connected to the inner tubing annulus of the multi-annuli pipe segment, in which the annulus divider ring is conformally deformed around the intermediate barrier layer of the multi-annuli pipe segment to facilitate blocking fluid flow from the inner fitting annulus to the outer fitting annulus.

In another embodiment, a method of deploying a pipe fitting includes cutting back an outer barrier layer and a first intermediate layer of pipe segment tubing to expose a portion of an intermediate barrier layer of the pipe segment tubing, in which the first intermediate layer is included in an outer tubing annulus of the pipe segment tubing and the intermediate barrier layer separates the outer tubing annulus from an inner tubing annulus of the pipe segment tubing, inserting the pipe segment tubing into a tubing cavity defined between a fitting jacket and a fitting body of the pipe fitting such that the outer tubing annulus of the pipe segment tubing opens to an outer fitting annulus that is defined between the fitting jacket and an annulus divider ring secured to the fitting jacket and the intermediate barrier layer, a second intermediate layer included in the inner tubing annulus, and an inner barrier layer of the pipe segment tubing are disposed within an inner fitting annulus that is defined between the annulus divider ring and the fitting body, compressing the pipe segment tubing between the fitting jacket and the fitting body to facilitate securing the pipe fitting to the pipe segment tubing at least in part by applying swaging force to the fitting jacket, and conformally deforming the annulus divider ring around the intermediate barrier layer of the pipe segment tubing to facilitate blocking fluid flow from the inner fitting annulus to the outer fitting annulus at least in part by transferring a portion of the swaging force from the fitting jacket to the annulus divider ring via a load transfer ring disposed within the outer fitting annulus.

In another embodiment, a pipe fitting includes a fitting tube that defines a fitting bore to be fluidly connected to a pipe bore defined by pipe segment tubing, a grab ring disposed around the fitting tube to enable a swage machine to be connected to the pipe fitting, a fitting jacket secured to the grab ring to define a tubing cavity between the fitting jacket and the fitting tube, in which the fitting jacket is to be conformally deformed around an outer barrier layer of the pipe segment tubing to facilitate securing the pipe fitting to the pipe segment tubing, an annulus divider ring secured to an inner surface of the fitting jacket to divide the tubing cavity into a reinforcement fitting annulus that is to be fluidly connected to a reinforcement tubing annulus of the pipe segment tubing and a venting fitting annulus that is to be fluidly connected to a venting tubing annulus of the pipe segment tubing, in which the venting tubing annulus and the reinforcement tubing annulus are separated in the pipe segment tubing by an intermediate barrier layer, and a load transfer ring disposed between the fitting jacket and the annulus divider ring, in which the load transfer ring transfers a portion of swaging force applied to the fitting jacket to conformally deform the fitting jacket around the outer barrier layer of the pipe segment tubing from the fitting jacket to the annulus divider ring to facilitate blocking fluid flow from the venting fitting annulus of the pipe fitting to the reinforcement fitting annulus at least in part by using the portion of the swaging force to conformally deform the annulus divider ring around the intermediate barrier layer of the pipe segment tubing.

DETAILED DESCRIPTION

Figure 1:
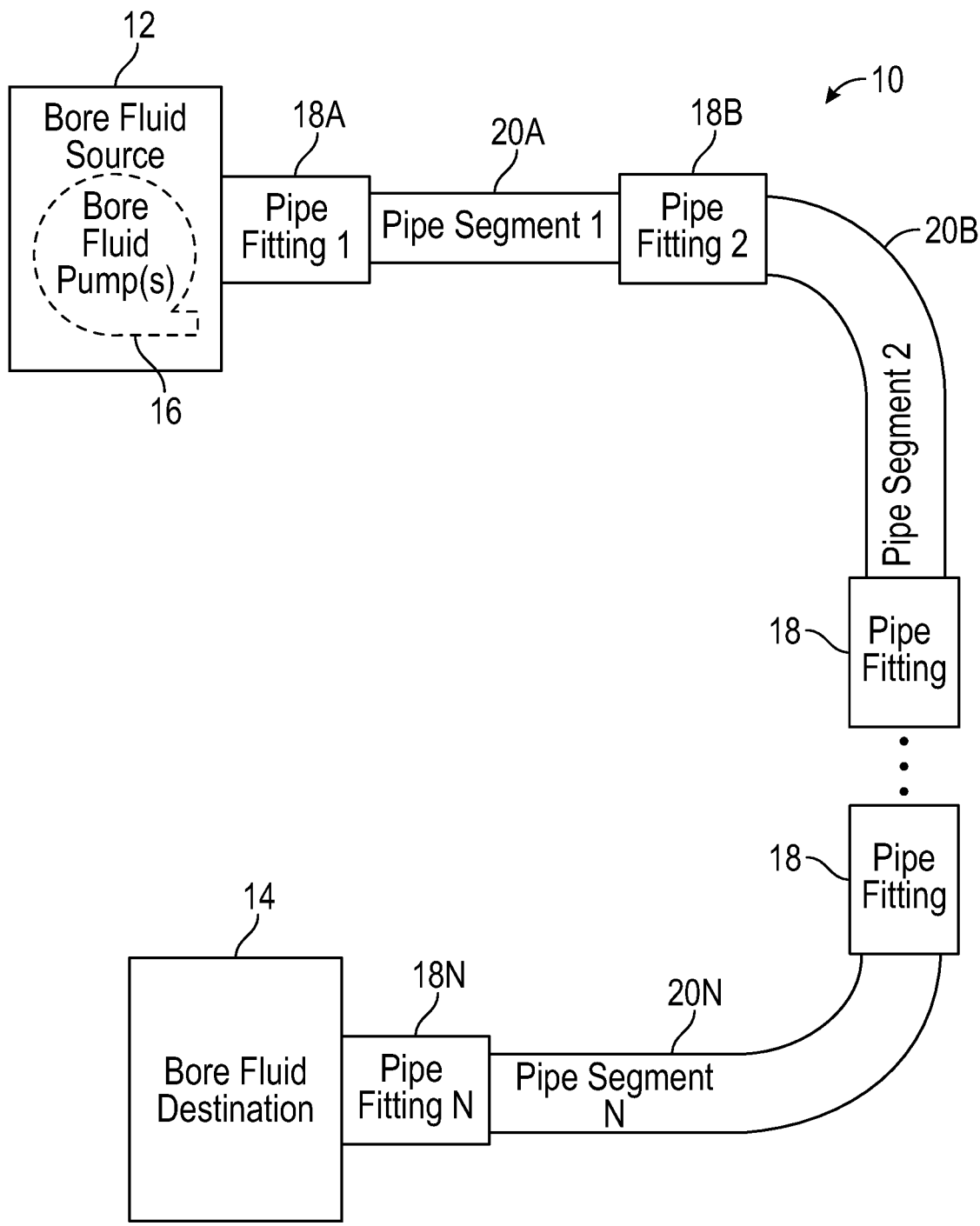
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system includes pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to fluidly connect the first pipe segment to the fluid source, a midline pipe fitting secured between the first pipe segment and a second pipe segment to fluidly connect the first pipe segment to the second pipe segment, and a second pipe end fitting secured to the second pipe segment to fluidly connect the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to isolate environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate improving fluid isolation, in some instances, the tubing of a pipe segment may include multiple tubing layers. For example, the tubing of a pipe segment may include an inner barrier (e.g., liner) layer and an outer barrier (e.g., shield or sheath) layer that each run (e.g., span) the length of the pipe segment. To facilitate blocking fluid flow directly therethrough, the inner barrier layer and the outer barrier layer may each be a continuous layer of solid material, such as plastic and/or a composite material, that runs the length of the pipe segment.

To improve its tensile strength and/or its hoop strength, the tubing of a pipe segment may additionally include one or more reinforcement layers between its inner barrier layer and its outer barrier layer. In particular, a reinforcement layer of the pipe segment tubing may be formed from solid material that has a higher tensile strength and/or a higher linear elasticity modulus (e.g., stiffness) as compared to the inner barrier layer and/or the outer barrier layer of the pipe segment tubing. For example, the reinforcement layer of the pipe segment tubing may be formed using metal, such as steel, while the inner barrier layer and the outer barrier layer of the pipe segment tubing are formed using plastic, such as high-density polyethylene (HDPE).

Nevertheless, in some instances, a reinforcement layer of pipe segment tubing may include solid material as well as one or more openings devoid of solid material, for example, to implement a flexible pipe that may be spooled on a reel and/or in a coil. Merely as an illustrative non-limiting example, the reinforcement layer of the pipe segment tubing may include solid material helically wrapped (e.g., wound) on the inner barrier layer of the pipe segment tubing such that gaps are left between adjacent wraps of the solid material to define a helically-shaped opening that runs along the pipe segment tubing. In other words, in such instances, the reinforcement layer may have one or more gaps devoid of solid material and, thus, may be included in a reinforcement tubing annulus of the pipe segment tubing, which is between the inner barrier layer and the outer barrier layer of the pipe segment tubing.

Even when a continuous layer of solid material, at least in some instances, fluid (e.g., gas and/or liquid) may nevertheless gradually permeate (e.g., pass) through the inner barrier layer and/or outer barrier layer of the tubing of a pipe segment. In other words, at least in some instances, some amount of fluid may permeate from the pipe bore of the pipe segment through the inner barrier layer of the pipe segment tubing and/or from environmental conditions external to the pipe segment through the outer barrier layer of the tubing into the reinforcement tubing annulus of the pipe segment and, thus, contact the solid material of one or more reinforcement layers included in the reinforcement tubing annulus. Moreover, at least in some instance, fluid that permeates through the inner barrier layer and/or the outer barrier layer of a pipe segment, such as hydrogen sulfide ($H_2S$) and/or carbon dioxide ($CO_2$), may potentially corrode solid material in one or more reinforcement layers of a pipe segment and, thus, potentially weaken the tensile strength and/or the hoop strength of the pipe segment.

To facilitate improving tensile strength and/or hoop strength, as will be described in more detail below, the tubing of a pipe segment may be implemented to define a venting tubing annulus, which includes one or more venting layers, in addition to a reinforcement tubing annulus and, thus, multiple tubing annuli. To define multiple tubing annuli, a pipe segment may include one or more intermediate barrier layers between its outer barrier layer and its inner barrier layer. For example, an intermediate barrier layer in a pipe segment may be implemented to separate a reinforcement tubing annulus in the pipe segment from a venting tubing annulus in the pipe segment.

In particular, in some instances, a venting tubing annulus of pipe segment tubing may be internal to an intermediate barrier layer of the pipe segment tubing while the reinforcement tubing annulus of the pipe segment tubing is external to the intermediate barrier layer. In other words, in such instances, the venting tubing annulus may facilitate venting fluid (e.g., potentially corrosive fluid) that permeates through the inner barrier layer of the pipe segment tubing before the fluid reaches the reinforcement tubing annulus of the pipe segment tubing. Additionally or alternatively, in some instances, a venting tubing annulus of pipe segment tubing may be external to an intermediate barrier layer of the pipe segment tubing while the reinforcement tubing annulus of the pipe segment tubing is internal to the intermediate barrier layer. In other words, in such instances, the venting tubing annulus may facilitate venting fluid (e.g., potentially corrosive fluid and/or external environmental fluid) that permeates through the outer barrier layer of the pipe segment tubing before it reaches the reinforcement tubing annulus and/or a pipe bore of the pipe segment.

In any case, a venting tubing annulus of a pipe segment may generally vent fluid by routing the fluid to a vent port on a pipe fitting. However, when a tubing cavity of a pipe fitting is a contiguous open space, the pipe fitting may effectively have a single fitting annulus. In other words, when the tubing of a multi-annuli pipe segment is secured in such a pipe fitting, the pipe fitting may enable fluid to nevertheless flow from a venting tubing annulus of the multi-annuli pipe segment into a reinforcement tubing annulus of the multi-annuli pipe segment, which may potentially weaken the tensile strength and/or the hoop strength of the multi-annuli pipe segment, for example, due to the fluid corroding solid material in one or more reinforcement layers of the multi-annuli pipe segment.

Accordingly, to facilitate improving pipeline tensile strength and/or hoop strength, the present disclosure provides techniques for implementing (e.g., manufacturing) and/or deploying (e.g., installing) a pipe fitting with multiple fitting annuli. As will be described in more detail below, to enable fluid flow therethrough, a multi-annuli pipe fitting generally includes a fitting body, which defines a fitting bore. Additionally, as will be described in more detail below, a multi-annuli pipe fitting may be implemented to enable pipe segment tubing to be secured and sealed therein via swaging techniques. To enable a multi-annuli pipe fitting to be secured using swaging techniques, in some embodiments, its fitting body may include a fitting tube, which defines its fitting body, and a grab ring, which is disposed around (e.g., surrounding) the fitting tube, for example, to enable a swage machine to be connected to the multi-annuli pipe fitting.

Additionally, to enable securement using swaging techniques, a multi-annuli pipe fitting may generally include one or more fitting jackets secured (e.g., welded) to its fitting body (e.g., grab ring). In particular, a fitting jacket may be secured to the fitting body such that a tubing cavity is defined between an inner surface of the fitting jacket and an outer surface of the fitting body (e.g., fitting tube). To secure the multi-annuli pipe fitting to a multi-annuli pipe segment, the tubing of the multi-annuli pipe segment may be inserted into the tubing cavity and the fitting jacket may be conformally deformed (e.g., swaged) around the pipe segment tubing, thereby compressing the pipe segment tubing between the fitting jacket and the fitting body, for example, via a swage machine. In fact, in some embodiments, engagement between the fitting jacket and the outer barrier layer of the pipe segment tubing due to swaging may facilitate sealing tubing annuli of the multi-annuli pipe segment from external environmental condition while engagement between the fitting body and the inner barrier layer of the pipe segment tubing due to swaging may facilitate sealing the tubing annuli from the pipe bore of the multi-annuli pipe segment.

To facilitate blocking fluid flow from a venting tubing annulus of a multi-annuli pipe segment to a reinforcement tubing annulus of the multi-annuli pipe segment, a multi-annuli pipe fitting may additionally include one or more annulus divider rings, which are each secured to an inner surface of a fitting jacket. In particular, an annulus divider ring may be substantially parallel to a corresponding fitting jacket such that an outer (e.g., reinforcement) fitting annulus is defined between an inner surface of the fitting jacket and an outer surface of the annulus divider ring while an inner (e.g., venting) fitting annulus is defined between an inner surface of the annulus divider ring and an outer surface of a corresponding fitting body (e.g., fitting tube). To facilitate venting fluid from the tubing annuli of a multi-annuli pipe segment, the outer fitting annulus may be fluidly connected to an outer (e.g., reinforcement) tubing annulus of the multi-annuli pipe segment while the inner fitting annulus may be fluidly connected to an inner (e.g., venting) tubing annulus of the multi-annuli pipe segment.

To fluidly connect an outer tubing annulus of a multi-annuli pipe segment to an outer fitting annulus of a multi-annuli pipe fitting, the tubing of the multi-annuli pipe segment may be inserted into a corresponding tubing cavity such that one or more tubing layers in the outer tubing annulus open to the outer fitting annulus. Additionally, to fluidly connect an inner tubing annulus of the multi-annuli pipe segment to an inner fitting annulus of the multi-annuli pipe fitting, the tubing of the multi-annuli pipe segment may be inserted into the tubing cavity such that the inner barrier layer, each tubing layer in the inner tubing annulus, and an intermediate barrier layer of the multi-annuli pipe segment are disposed within the inner fitting annulus and, thus, under a corresponding annulus divider ring. To enable the intermediate barrier layer to be disposed under the annulus divider ring, the outer barrier layer and each tubing layer in the outer tubing annulus of the multi-annuli pipe segment may be cutback relative to the intermediate barrier layer, thereby exposing a portion of the intermediate barrier layer.

After the tubing of a multi-annuli pipe segment is inserted into a tubing cavity of a multi-annuli pipe fitting, to facilitate blocking fluid flow from a venting tubing annulus to a reinforcement tubing annulus, in some embodiments, different fitting annuli of the multi-annuli pipe fitting may be sealed from one another. In particular, to seal an inner fitting annulus from an outer fitting annulus, a corresponding annulus divider ring may be conformally deformed around an intermediate barrier layer of the multi-annuli pipe segment, thereby compressing the inner barrier layer, each tubing layer in an inner tubing annulus, and an intermediate barrier layer of the multi-annuli pipe segment between the annulus divider ring and the fitting body (e.g., fitting tube) of the multi-annuli pipe fitting. In fact, a portion of the force used to conformally deform a corresponding fitting jacket around the tubing of the multi-annuli pipe segment may be used to conformally deform the annulus divider ring around the intermediate barrier layer of the multi-annuli pipe segment. To facilitate transferring force exerted on the fitting jacket to the annulus divider ring, the multi-annuli pipe fitting may include one or more load transfer rings, which are each disposed within the outer fitting annulus such that an outer surface of the load transfer ring abuts an inner surface of the fitting jacket and an inner surface of the load transfer ring abuts an outer surface of the annulus divider ring.

To facilitate venting a fitting annulus and, thus, a corresponding tubing annulus, in some embodiments, a multi-annuli pipe fitting may additionally include one or more vent ports. For example, in some such embodiments, the multi-annuli pipe fitting may include a vent port formed through a fitting jacket to a fitting annulus of the multi-annuli pipe fitting. In other such embodiments, the multi-annuli pipe fitting may include a vent port, which is formed in its fitting body (e.g., grab ring), and a fluid path, which formed through the fitting body to connect a fitting annulus of the multi-annuli pipe fitting to the vent port.

Additionally, in some embodiments, a fitting annulus in a multi-annuli pipe fitting may not vent directly to external environmental conditions and instead vent to another fitting annulus. In particular, in some such embodiments, the multi-annuli pipe fitting may include a one-way valve, which enables fluid flow from a reinforcement fitting annulus to a venting fitting annulus while blocking fluid flow from the venting fitting annulus to the reinforcement fitting annulus, connected between the reinforcement fitting annulus and the venting fitting annulus, for example, through a corresponding annulus divider ring. Additionally, in some such embodiments, the multi-annuli pipe fitting may include a fluid path formed through its fitting body (e.g., grab ring) to fluidly connect fitting annuli of the same type. Furthermore, in some such embodiments, the multi-annuli pipe fitting may include one or more external fluid conduits, such as hose, fluidly connected between vent ports corresponding with the same type of fitting annuli. In this manner, as will be described in more detail below, the present disclosure provides techniques for implementing (e.g., manufacturing) and/or deploying (e.g., installing) a multi-annuli pipe fitting, which, at least in some instances, may facilitate improving pipeline tensile strength and/or hoop strength, for example, by providing fluid isolation between a venting fitting annulus and a reinforcement fitting of the multi-annuli pipe fitting and, thus, fluid isolation between a venting tubing annulus and a reinforcement tubing annulus of a corresponding multi-annuli pipe segment.

To help illustrate, an example of a pipeline system 10 is shown in FIG. 1. As in the depicted example, a pipeline system 10 may generally be connected between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be included at the bore fluid source 12, for example, when fluid flow through the bore of the pipeline system 10 is produced by gravity. Additionally or alternatively, in other embodiments, one or more bore fluid pumps 16 may be included in the pipeline system 10 and/or the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which connects the bore fluid source 12 to the first pipe segment 20A, a second pipe (e.g., midline) fitting 18B, which connects the first pipe segment 20A to the second pipe segment 20B, and an Nth pipe (e.g., end) fitting 18N, which connects the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, the tubing of a pipe segment 20 may include multiple different tubing layers. For example, the tubing of a pipe segment 20 may include a first high-density polyethylene (e.g., internal barrier) layer, one or more intermediate (e.g., steel strip) layers external to the first high-density polyethylene layer, and a second high-density polyethylene (e.g., external corrosion protection) layer external to the one or more intermediate layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To improve pipe flexibility, in some embodiments, the tubing of a pipe segment 20 that defines (e.g., encloses) its pipe bore may additionally include free space (e.g., one or more gaps) devoid of solid material. In fact, in some embodiments, free space defined in the tubing of a pipe segment 20 may run (e.g., span) the length of the pipe segment 20 and, thus, define (e.g., enclose) a fluid conduit (e.g., free space) in the annulus of the tubing, which is separate from the pipe bore. In other words, in such embodiments, fluid may flow through a pipe segment 20 via its pipe bore, free space (e.g., gaps and/or one or more fluid conduits) defined within its tubing annulus, or both.

Figure 2:
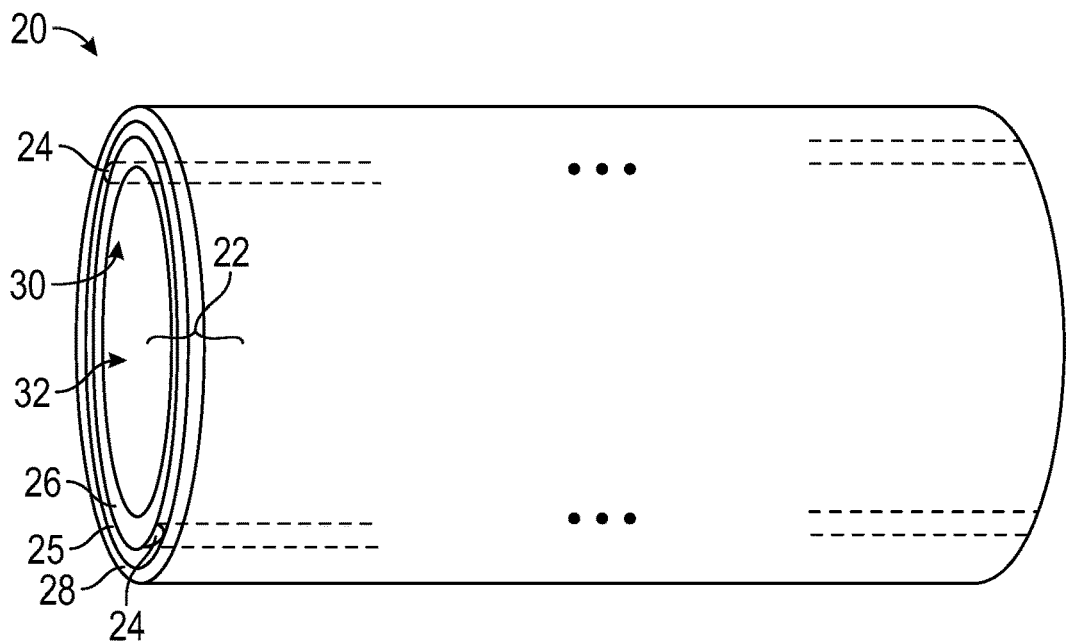
FIG. 2 is a side view of an example of a pipe segment of FIG. 1 that includes a pipe bore defined by its tubing as well as fluid conduits defined within an annulus of its tubing, in accordance with an embodiment of the present disclosure.

To help illustrate, an example of a pipe segment 20, which includes tubing 22 with fluid conduits (e.g., free space) 24 defined in its annulus 25, is shown in FIG. 2. As depicted, the pipe segment tubing 22 includes multiple tubing layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may made from composite material and/or plastic, such as high-density polyethylene (HDPE), raised temperature polyethylene (PE-RT), cross-linked polyethylene (XLPE), polyamide 11 (PA-11), polyamide 12 (PA-12), polyvinylidene difluoride (PVDF), or other materials or combinations of materials. Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner barrier layer 26 and its outer barrier layer 28. As will be described in more detail below, the tubing annulus 25 may include one or more intermediate layers of the pipe segment tubing 22. Furthermore, as depicted, fluid conduits (e.g., free space and/or gaps) 24 running the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 defined in its annulus 25 may include less solid material and, thus, exert less resistance to flexure, for example, compared to solid pipe segment tubing 22 and/or pipe segment tubing 22 that does not include fluid conduits 24 defined therein. Moreover, to further improve pipe flexibility, in some embodiments, one or more tubing layers in the tubing 22 of a pipe segment 20 may be unbonded from one or more other tubing layers and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more that two (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the longitudinal extent of the pipe bore 32.

Figure 3:
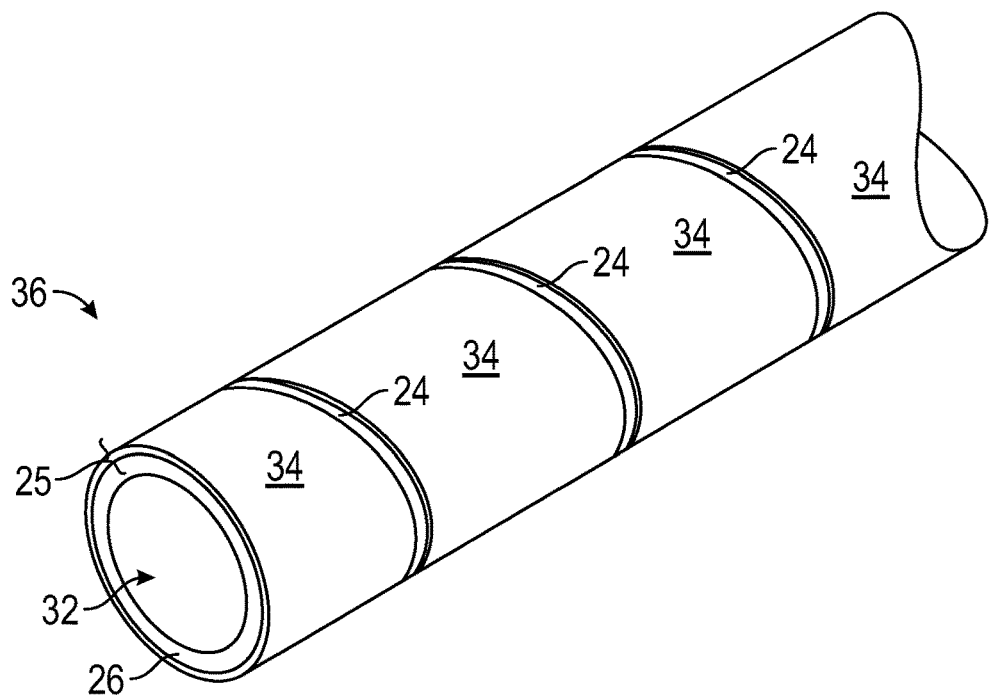
FIG. 3 is an example of a portion of the pipe segment of FIG. 2 with a helically shaped fluid conduit defined within its tubing annulus, in accordance with an embodiment of the present disclosure.

To help illustrate, an example of a portion 35 of a pipe segment 20, which includes an inner barrier layer 26 and an intermediate layer 34 included in its tubing annulus 25, is shown in FIG. 3. In some embodiments, one or more intermediate layers 34 of the pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a metal (e.g., steel) strip around the inner barrier layer 26 at a non-zero lay angle relative to the longitudinal extent of the pipe bore 32. In such a case, the resulting fluid conduit 24 runs helically along the pipe segment 20.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of a pipe segment 20 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that free space is left between adjacent windings to implement one or more corresponding fluid conduits 24 in the tubing annulus 25 of the pipe segment 20.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

In any case, as described above, in some embodiments, the depicted intermediate layer 34 may be implemented using a solid material that has a stronger tensile strength and/or a stronger linear elasticity modulus (e.g., stiffness) as compared to the inner barrier layer 26 and the outer barrier layer 28 of the pipe segment tubing 22. For example, the depicted intermediate layer 34 may be metal, such as steel, while the inner barrier layer 26 and the outer barrier layer 28 are plastic, such as high-density polyethylene (HDPE). In other words, in such embodiments, the depicted intermediate layer 34 may be a reinforcement layer of the pipe segment tubing 22 and the depicted tubing annulus 25 may be a reinforcement tubing annulus 25 of the pipe segment tubing 22.

However, even when implemented as a continuous solid layer of material, at least in some instances, some amount of fluid may nevertheless gradually permeate from the pipe bore 32 of a pipe segment 20 through its inner barrier layer 26 and/or from external environmental conditions through its outer barrier layer 28. In other words, fluid that permeates through the inner barrier layer 26 and/or the outer barrier layer 28 may flow into a fluid conduit 24 defined by a reinforcement (e.g., intermediate) layer and, thus, contact the solid material of the reinforcement layer. As described above, in some embodiments, the inner barrier layer 26 and/or the outer barrier layer 28 may be implemented using different types of solid material as compared to a reinforcement layer of pipe segment tubing 22, for example, such that the inner barrier layer 26 and the outer barrier layer 28 are plastic while the reinforcement layer is metal. In some instances, the solid material of the reinforcement layer may be more susceptible to corrosion as compared to the solid material of the inner barrier layer 26 and/or the outer barrier layer 28. Thus, to facilitate improving its tensile strength and/or hoop strength, a pipe segment 20 may be implemented to additionally include one or more venting tubing annuli to facilitate venting fluid, which may potentially corrode the solid material in the reinforcement layer, out from the tubing 22 of the pipe segment 20 before the fluid reaches the reinforcement layer.

Figure 4:
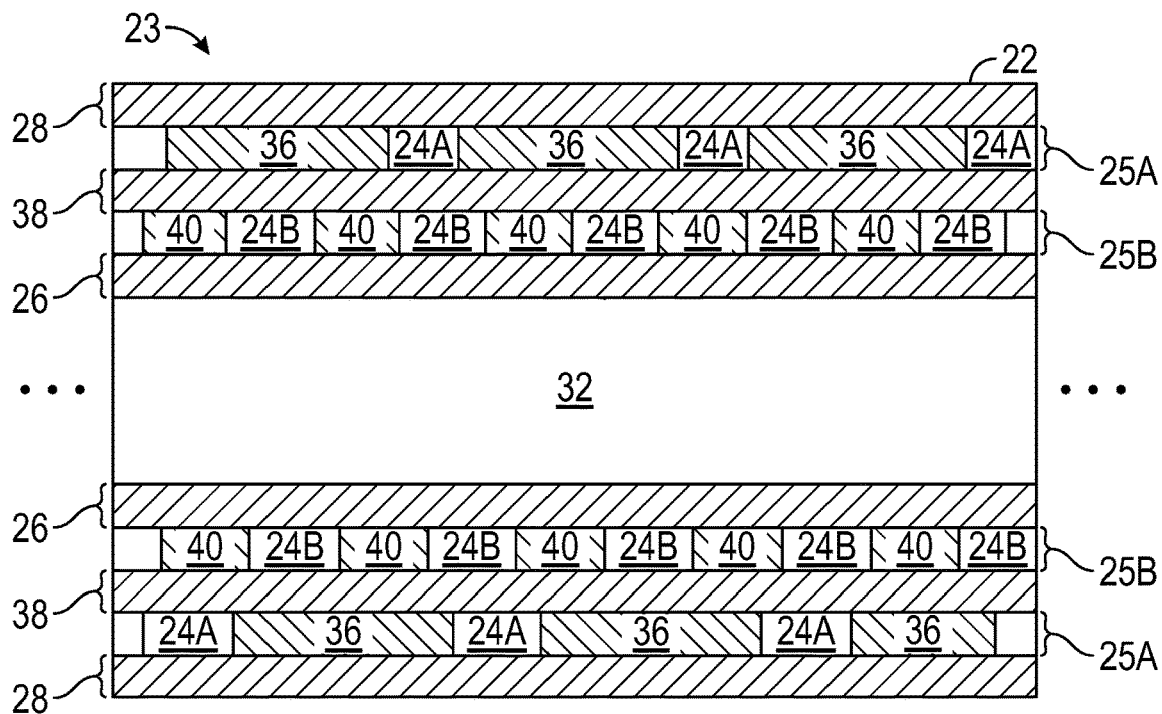
FIG. 4 is a cross-sectional view of an example of a pipe segment that includes multiple (e.g., dual) tubing annuli, in accordance with an embodiment of the present disclosure.

To help illustrate, an example of a pipe segment 20—namely a multi-annuli pipe segment 23—which includes a reinforcement tubing annulus 25A and a venting tubing annulus 25B defined in its tubing 22, is shown in FIG. 4. As depicted, the reinforcement tubing annulus 25A includes a reinforcement layer 36 that defines a reinforcement fluid conduit 24A. Additionally, as depicted, the pipe segment tubing 22A includes an inner barrier layer 26, which defines a pipe bore 32, and an outer barrier layer 28, which is disposed around the reinforcement tubing annulus 25A.

In addition to the inner barrier layer 26 and the outer barrier layer 28, as depicted, the pipe segment tubing 22A includes an intermediate barrier layer 38, which separates the reinforcement tubing annulus 25A and the venting tubing annulus 25B. To facilitate providing fluid isolation, in some embodiments, the intermediate barrier layer 38 may be formed as a continuous solid layer of a polymer (e.g., plastic), such as high-density polyethylene (HDPE) and/or raised temperature polyethylene (PE-RT). In fact, in some embodiments, the intermediate barrier layer 38 may be formed using the same type of solid material as the inner barrier layer 26 and/or the outer barrier layer 28. However, in other embodiments, the intermediate barrier layer 38 may be formed using a different type of solid material as compared to the inner barrier layer 26 and/or the outer barrier layer 28. In particular, in some such embodiments, the intermediate barrier layer 38 may be formed using a solid material that is less permeable to fluid (e.g., potentially corrosive fluid) as compared to the solid material of the inner barrier layer 26, for example, to facilitate venting fluid out from the venting tubing annulus 25B faster than the fluid permeates into the venting tubing annulus 25B and, thus, reducing permeation of the fluid into the reinforcement tubing annulus 25A, which is external to the venting tubing annulus 25B.

To facilitate venting fluid therefrom, as depicted, the venting tubing annulus 25B includes a venting layer 40 that defines a venting fluid conduit 24B, for example, which may be fluidly coupled to a vent port on a pipe fitting 18. In particular, in some embodiments, the venting layer 40 may formed from solid material that is less susceptible to corrosion as compared to solid material in the reinforcement layer 36. Additionally, in some embodiments, the venting layer 40 may be formed from solid material that resists permeation of fluid that is potentially corrosive to the solid material in the reinforcement layer 36. For example, the venting layer 40 may be formed using a polymer (e.g., plastic) and/or aluminum while the reinforcement layer 36 is formed using steel. In this manner, a multi-annuli pipe segment 23 may be implemented to facilitate venting fluid (e.g., potentially corrosive fluid) that permeates through its inner barrier layer 26 before it reaches a reinforcement tubing annulus 25A, for example, at least in part by using a venting tubing annulus 25B between the inner barrier layer 26 and the reinforcement tubing annulus 25A to route the fluid to a vent port on a pipe fitting 18 that is fluidly coupled to the venting tubing annulus 25B.

However, it should be appreciated that the depicted example is merely intended to be illustrative and not limiting. In particular, although a single venting layer 40 is depicted, in other embodiments, the venting tubing annulus 25B of a multi-annuli pipe segment 23 may include multiple venting layers 40. Additionally or alternatively, although a single reinforcement layer 36 is depicted, as described above, in other embodiments, the reinforcement tubing annulus 25A of a multi-annuli pipe segment 23 may include multiple reinforcement layers 36. Furthermore, in other embodiments, a venting tubing annulus 25B of a multi-annuli pipe segment 23 may be external to an intermediate barrier layer 38 while a reinforcement tubing annulus 25A is internal to the intermediate barrier layer 38, for example, to facilitate venting fluid (e.g., potentially corrosive fluid) that permeates through the outer barrier layer 28 of the multi-annuli pipe segment 23 before it reaches the reinforcement tubing annulus 25A. In fact, although a single venting tubing annulus 25B is depicted, in other embodiments, a multi-annuli pipe segment 23 may include multiple venting tubing annuli 25B, for example, including an inner (e.g., first) venting tubing annulus 25B internal to a reinforcement tubing annulus 25A as well as an outer (e.g., second) venting tubing annulus 25B external to the reinforcement tubing annulus 25A. Moreover, in some embodiments, a multi-annuli pipe segment 23 may additionally include barrier tape, for example, disposed between a reinforcement layer 36 and an outer barrier layer 28, between a venting layer 40 and an intermediate barrier layer 38, between a reinforcement layer 36 and an intermediate barrier layer 38, between a venting layer 40 and an outer barrier layer 28, or any combination thereof.

In any case, as described above, in a pipeline system 10, a pipe segment 20 is generally secured and sealed in a pipe fitting 18. In particular, in some instances, a pipe fitting 18 may be secured to a pipe segment 20 via swaging techniques, for example, which conformally deform a fitting jacket of the pipe fitting 18 around the tubing 22 of the pipe segment 20. In fact, the fitting jacket may be conformally deformed using special-purpose deployment equipment— namely a swage machine.

Figure 5:
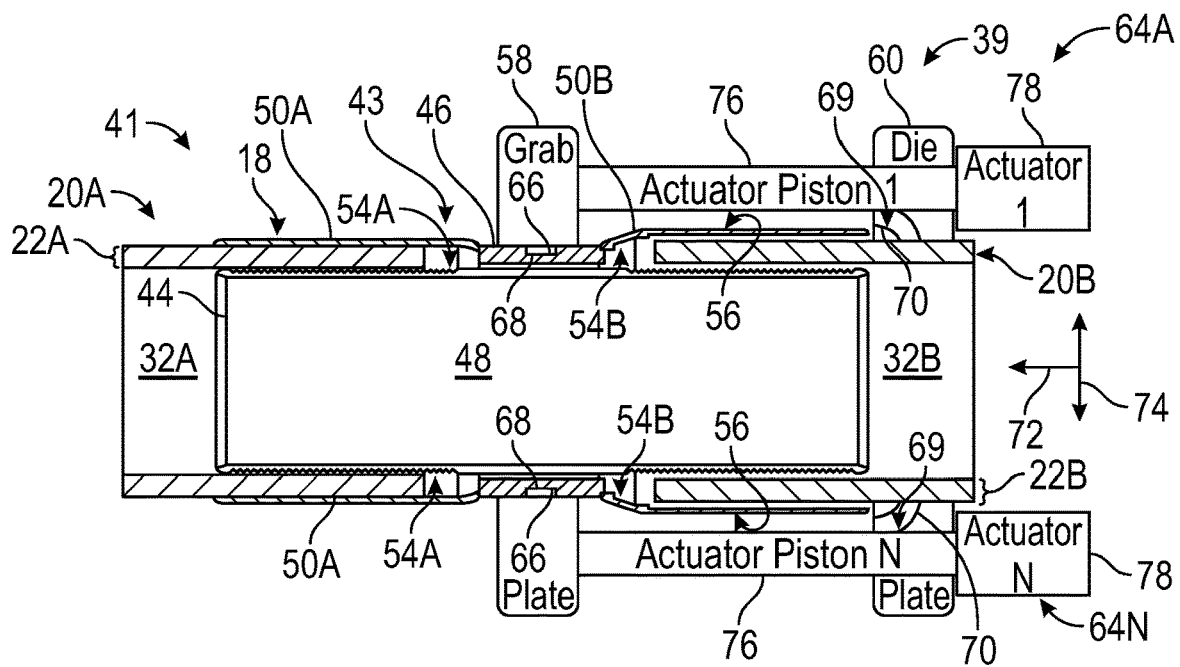
FIG. 5 is a cross-sectional view of an example of a swage machine and a portion of a pipeline system, in accordance with an embodiment of the present disclosure.

To help illustrate, an example of a swage machine 39 and a portion 41 of a pipeline system 10 are shown in FIG. 5. As depicted, the portion 41 of the pipeline system 10 includes a first pipe segment 20A, a second pipe segment 20B, and a pipe fitting 18, which is disposed between the first pipe segment 20A and the second pipe segment 20B. Additionally, as depicted, the pipe fitting 18 has a fitting body 43 that includes a fitting tube 44 and a grab ring 46, which is disposed around (e.g., surrounding) the fitting tube 44. In particular, as depicted, the fitting tube 44 defines (e.g., encloses) a fitting bore 48, which is fluidly coupled to a first pipe bore 32A of the first pipe segment 20A and a second pipe bore 32B of the second pipe segment 20B.

In other words, the pipe fitting 18 of FIG. 5 may be a midline pipe fitting 18. However, it should be appreciated that the depicted example is merely intended to be illustrative and not limiting. In particular, it should be appreciated that, in other embodiments, the techniques described in the present disclosure may additionally or alternatively be used with other types of pipe fittings 18, such as a pipe end fitting 18.

In any case, as depicted, the pipe fitting 18 includes fitting jackets 50—namely a first fitting jacket 50A and a second fitting jacket 50B—disposed circumferentially around the fitting tube 44 and secured (e.g., welded) to the grab ring 46. In particular, as depicted, first tubing 22A of the first pipe segment 20A is disposed in a first tubing cavity 54A of the pipe fitting 18, which is defined between the first fitting jacket 50A and the fitting tube 44. Similarly, second tubing 22B of the second pipe segment 20B is disposed in a second tubing cavity 54B of the pipe fitting 18, which is defined between the second fitting jacket 50B and the fitting tube 44.

However, as depicted, open space 56 is present between the second tubing 22B of the second pipe segment 20B and the second fitting jacket 50B of the pipe fitting 18 whereas minimal open space is present between the first tubing 22A of the first pipe segment 20A and the first fitting jacket 50A of the pipe fitting 18. As such, the pipe fitting 18 may exert more resistance to tubing movement in the first tubing cavity 54A and, thus, facilitate securing the pipe fitting 18 to the first pipe segment 20A. On the other hand, the pipe fitting 18 may exert less resistance to tubing movement in the second tubing cavity 54B, which, at least in some instances, may enable the second tubing 22B of the second pipe segment 20B to move relatively freely into and/or out from the second tubing cavity 54B of the pipe fitting 18. As such, to facilitate securing the pipe fitting 18 to the second pipe segment 20B, the swage machine 39 may be operated to conformally deform (e.g., swage) the second fitting jacket 50B around the second tubing 22B of the second pipe segment 20B, thereby consuming at least a portion (e.g., majority) of the open space 56.

To facilitate conformally deforming a fitting jacket 50 around pipe segment tubing 22, as depicted, the swage machine 39 includes a grab plate 58 and a die plate 60. In particular, the grab plate 58 of the swage machine 39 includes a grab tab 66, which is implemented (e.g., sized and/or shaped) to matingly interlock (e.g., engage and/or interface) with a grab notch 68 on the grab ring 46 of the pipe fitting 18. In other words, the grab plate 58 may be implemented to facilitate securing the swage machine 39 to the pipe fitting 18.

Additionally, as depicted, the die plate 60 of the swage machine 39 includes a die seat 69, which enables a set of die segments 70 to be loaded therein. In particular, the set of die segments 70 is loaded into the die plate 60 such that the set of die segments 70 opens toward the grab plate 58 of the swage machine 39. As such, when compressed against a fitting jacket 50 of the pipe fitting 18 in an axial direction 72 toward the grab plate 58, the shape of the set of die segments 70 may compress the fitting jacket 50 circumferentially inward in a radial direction 74. In particular, the fitting jacket 50 may be deformed such that corresponding pipe segment tubing 22 is compressed between the fitting jacket 50 and a corresponding fitting body 43 (e.g., fitting tube 44), thereby securing the pipe fitting 18 to the pipe segment tubing 22. Additionally, in some embodiments, engagement between the inner surface of the fitting jacket 50 and the outer surface of the pipe segment tubing 22 due to swaging may facilitate sealing a tubing annulus 25 of the pipe segment tubing 22 from external environmental conditions while engagement between the inner surface of the pipe segment tubing 22 and the outer surface of the fitting body 43 due to swaging may facilitate sealing the tubing annulus 25 from the pipe bore 32 of the pipe segment 20.

To facilitate compressing a set of die segments 70 loaded in its die plate 60 against a fitting jacket 50 in an axial direction 72, as in the depicted example, a swage machine 39 may include one or more swaging actuators 64. In particular, in the depicted example, the swage machine 39 includes a first swaging actuator 64A and an Nth swaging actuator 64N. In some embodiments, a swaging actuator 64 in a swage machine 39 may be a fluid actuator, such as a hydraulic actuator or a pneumatic actuator. In any case, as depicted, each swaging actuator 64 of the swage machine 39 includes an actuator cylinder 78 and an actuator piston 76, which selectively extends out from the actuator cylinder 78 based at least in part on the supply of fluid (e.g., liquid and/or gas) to the actuator cylinder 78 and/or selectively retracts into the actuator cylinder 78 based at least in part on the extraction of fluid from the actuator cylinder 78.

In particular, in the depicted example, the actuator cylinder 78 of each swaging actuator 64 is secured to the die plate 60 of the swage machine 39. Additionally, in the depicted example, the actuator piston 76 of each swaging actuator 64 extends through the die plate 60 and is secured to the grab plate 58 of the swage machine 39. As such, to perform a swaging operation, one or more of swaging actuators 64 of the swage machine 39 may be operated to pull the grab plate 58 toward the die plate 60 via one or more reverse (e.g., retracting) strokes such that the second fitting jacket 50B of the pipe fitting 18 secured to the grab plate 58 moves through the set of die segments 70 loaded in the die plate 60.

However, it should be appreciated that the depicted example is merely intended to be illustrative and not limiting. In particular, it should be appreciated that the techniques described in the present disclosure are not limited to a specific configuration of a swage machine 39. For example, in other embodiments, a swage machine 39 may include fewer than two (e.g., one) swaging actuators 64 or more than two (e.g., three, four, or more) swaging actuators 64. Additionally, in other embodiments, a swage machine 39 may conformally deform a fitting jacket 50 around corresponding pipe segment tubing 22 by moving its die plate 60 over the fitting jacket 50 via one or more forward (e.g., extending) strokes. Furthermore, in other embodiments, a swage machine 39 may conformally deform a fitting jacket 50 around corresponding pipe segment tubing 22 by moving its die plate 60 over the fitting jacket 50 in an outward axial direction 72 away from its grab plate 58.

In any case, once the tubing 22 of a pipe segment 20 is secured and sealed in a pipe fitting 18, fluid may flow between a corresponding tubing cavity 54 of the pipe fitting 18 and each tubing annuli 25 in the pipe segment 20. When the tubing cavity 54 is a contiguous open space, the pipe fitting 18 may effectively have a single fitting annulus that enables fluid flow between different tubing annuli 25 of the pipe segment 20. However, as described above, a multi-annuli pipe segment 23 may include a venting tubing annulus 25B to vent fluid that permeates through its inner barrier layer 26 and/or its outer barrier layer 28 before the fluid reaches a reinforcement tubing annulus 25A of the pipe segment 20, for example, due to the permeated fluid potentially being corrosive to a reinforcement layer 36 in the reinforcement tubing annulus 25A. Thus, to facilitate improving pipeline tensile strength and/or hoop strength, the present disclosure provides techniques for implementing (e.g., manufacturing) and/or deploying (e.g., installing) a pipe fitting with multiple fitting annuli, for example, which may be sealed from one another.

Figure 6:
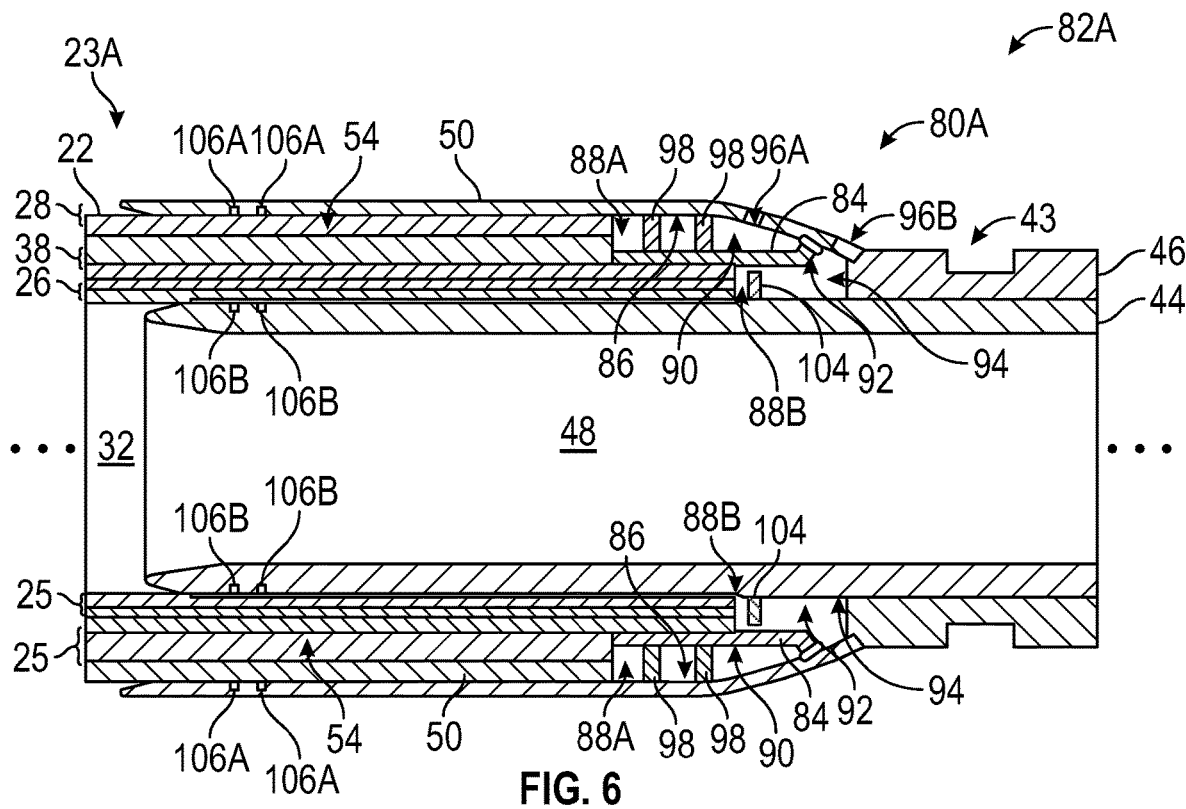
FIG. 6 is a cross-sectional view of an example of a portion of a multi-annuli pipe fitting secured to pipe segment tubing, in accordance with an embodiment of the present disclosure.

To help illustrate, an example of a portion 80A of a pipe fitting 18—namely a multi-annuli pipe fitting 82A—and a multi-annuli pipe segment 23A are shown in FIG. 6. Similar to the pipe fitting 18 of FIG. 4, as in the depicted example, a multi-annuli pipe fitting 82 may generally include a fitting body 43 and one or more fitting jackets 50, which are secured (e.g., welded) to the fitting body 43 to define corresponding tubing cavities 54. In particular, similar to FIG. 4, the fitting body 43 of FIG. 5 includes a fitting tube 44, which defines a fitting bore 48 that may be fluidly connected to a pipe bore 32 defined by the tubing 22 of the multi-annuli pipe segment 23A, and a grab ring 46, which is disposed around (e.g., surrounding) the fitting tube 44, for example, to enable a swage machine 39 to be connected to the multi-annuli pipe fitting 82A.

However, as depicted in FIG. 6, the multi-annuli pipe fitting 82A additionally includes an annulus divider ring 84. In particular, the annulus divider ring 84 is secured (e.g., welded) to an inner surface 86 of the fitting jacket 50 to divide the tubing cavity 54 into an outer (e.g., first and/or reinforcement) fitting annulus 88A, which is defined between the inner surface 86 of the fitting jacket 50 and an outer surface 90 of the annulus divider ring 84, and an inner (e.g., second and/or venting) fitting annulus 88B, which is defined between an inner surface 92 of the annulus divider ring 84 and an outer surface 94 of the fitting body 43. Additionally, as depicted, the inner barrier layer 26, an inner (e.g., venting) tubing annulus 25, and an intermediate barrier layer 38 of the pipe segment are disposed between the annulus divider ring 84 and the fitting body 43, thereby fluidly connecting the inner tubing annulus 25 to the inner fitting annulus 88B. Furthermore, as depicted, an outer (e.g., reinforcement) tubing annulus 25 opens to the outer fitting annulus 88A and, thus, is fluidly connected to the outer fitting annulus 88A.

Nevertheless, it should be appreciated that the depicted example is merely intended to be illustrative and not limiting. In particular, although a single fitting jacket 50 is depicted, in some embodiments, a multi-annuli pipe fitting 82 may be a midline pipe fitting 18 and, thus, include multiple (e.g., two) fitting jackets 50. On the other hand, in other embodiments, a multi-annuli pipe fitting 82 may be a pipe end fitting 18 and, thus, include a fitting jacket 50 as well as a fitting connector (e.g., weld neck, hub, or flange). Additionally, although a single annulus divider ring 84 is depicted, in other embodiments, multiple annulus divider rings 84 may be secured to a single fitting jacket 50, for example, to facilitate defining more than two fitting annuli 88 when a corresponding multi-annuli pipe segment 23 includes more than two tubing annuli 25. Merely as an illustrative non-limiting example, a first annulus divider ring 84 and a second annulus divider ring 84 may be secured to the fitting jacket 50 to define an outer venting fitting annulus between the fitting jacket 50 and the first annulus divider ring 84, a reinforcement fitting annulus between the first annulus divider ring 84 and the second annulus divider ring, and an inner venting fitting annulus between the second annulus divider ring 84 and a corresponding fitting body 43 (e.g., fitting tube 44).

In any case, as in the depicted example, to facilitate venting fluid therefrom, in some embodiments, a multi-annuli pipe fitting 82 may include one or more vent ports 96. In particular, in some such embodiments, a vent port 96 may be formed through a fitting jacket 50 to a tubing cavity 54 to enable the tubing cavity 54 to be vented. For example, an outer (e.g., first) vent port 96A may be formed through the fitting jacket 50 to the outer fitting annulus 88A to facilitate venting the outer fitting annulus 88A while an outer (e.g., second) vent port 96B may be formed through the fitting jacket 50 to the inner fitting annulus 88B to facilitate venting the inner fitting annulus 88B.

However, it should be again be appreciated that the depicted example is merely intended to be illustrative and not limiting. In particular, as will be described in more detail below, in other embodiments, a vent port 96 may be formed in the fitting body 43 (e.g., grab ring 46) of a multi-annuli pipe fitting 82. Additionally, as will be described in more detail below, a multi-annuli pipe fitting 82 may include fewer than two (e.g., one or zero) vent ports 96 or more than two (e.g., three, four, or more) vent ports 96. Furthermore, as will be described in more detail below, in other embodiments, a vent port 96 may not be directly connected to an outer fitting annulus 88A of a multi-annuli pipe fitting 82, for example, instead being fluidly connected to an outer tubing annulus 25 of a multi-annuli pipe segment 23 via an opening formed through the outer barrier layer 28 of the multi-annuli pipe segment 23. Moreover, as will be described in more detail below, in other embodiments, a vent port 96 may not vent directly to external environmental conditions.

In any case, similar to FIG. 5, the tubing 22 of the pipe segment 20 may be secured and sealed in the multi-annuli pipe fitting 82A via swaging techniques. In particular, to facilitate securing the multi-annuli pipe fitting 82A to pipe segment tubing 22, the fitting jacket 50 may be deformed such that the pipe segment tubing 22 is compressed between the fitting jacket 50 and the fitting body 43. Additionally, in some embodiments, engagement between the inner surface 86 of the fitting jacket 50 and the outer barrier layer 28 of the pipe segment tubing 22 due to swaging may facilitate sealing the tubing annuli 25 in the pipe segment tubing 22 from external environmental conditions while engagement between the outer surface 94 of the fitting body 43 (e.g., fitting tube 44) and the inner barrier layer 26 of the pipe segment tubing 22 due to swaging may facilitate sealing the tubing annuli 25 in the pipe segment tubing 22 from a pipe bore 32 defined by the pipe segment tubing 22.

In fact, swaging techniques may additionally be used to facilitate sealing different fitting annuli 88 of a multi-annuli pipe fitting 82 from each other. In particular, an outer fitting annulus 88A may be sealed from an inner fitting annulus 88A at least in part by conformally deforming a corresponding annulus divider ring 84 around an intermediate barrier layer 38 of a multi-annuli pipe segment 23. In fact, the annulus divider ring 84 may be conformally deformed around the intermediate barrier layer 38 using a portion of the swaging force used to conformally deform a corresponding fitting jacket 50 around the tubing 22 of the multi-annuli pipe segment 23.

However, it should again be appreciated that the depicted example is merely intended to be illustrative and not limiting. In particular, to facilitate improving securement strength, in some embodiments, a fitting jacket 50 may include one or more teeth (e.g., serrations) on its inner surface 86, a fitting body 43 may include one or more teeth on its outer surface 94, or both. Additionally or alternatively, an annulus divider ring 84 may include one or more teeth on its inner surface 92.

In any case, to facilitate transferring swaging force from a fitting jacket 50 to a corresponding annulus divider ring 84, as in the depicted example, a multi-annuli pipe fitting 82 may include one or more load transfer rings 98 disposed within an outer (e.g., reinforcement) fitting annulus 88A. In some embodiments, multiple load transfer rings 98 may be disposed in the outer fitting annulus 88A to facilitate distributing force more evenly along the annulus divider ring 84. In any case, a load transfer ring 98 may be disposed within the outer fitting annulus 88A such that its outer surface abuts the inner surface 86 of the fitting jacket 50 and its inner surface abuts the outer surface 90 of the annulus divider ring 84. By implementing in this manner, when swaging force is applied to the fitting jacket 50 to compress the fitting jacket 50 radially inward against pipe segment tubing 22, the load transfer ring 98 may transfer a portion of the swaging force to the annulus divider ring 84 to facilitate conformally deforming the annulus divider ring 84 around an intermediate barrier layer 38 of the pipe segment tubing 22 and, thus, sealing different fitting annuli 88 from one another.

However, it should again be appreciated that the depicted example is merely intended to be illustrative and not limiting. In particular, in other embodiments, a multi-annuli pipe fitting 82 may include a single load transfer ring 98 or more than two (e.g., three, four, or more) load transfer rings 98 disposed within its outer fitting annulus 88. In any case, to enable venting, in some embodiments, a load transfer ring 98 may include one or more fluid openings formed therethrough.

Figure 7:
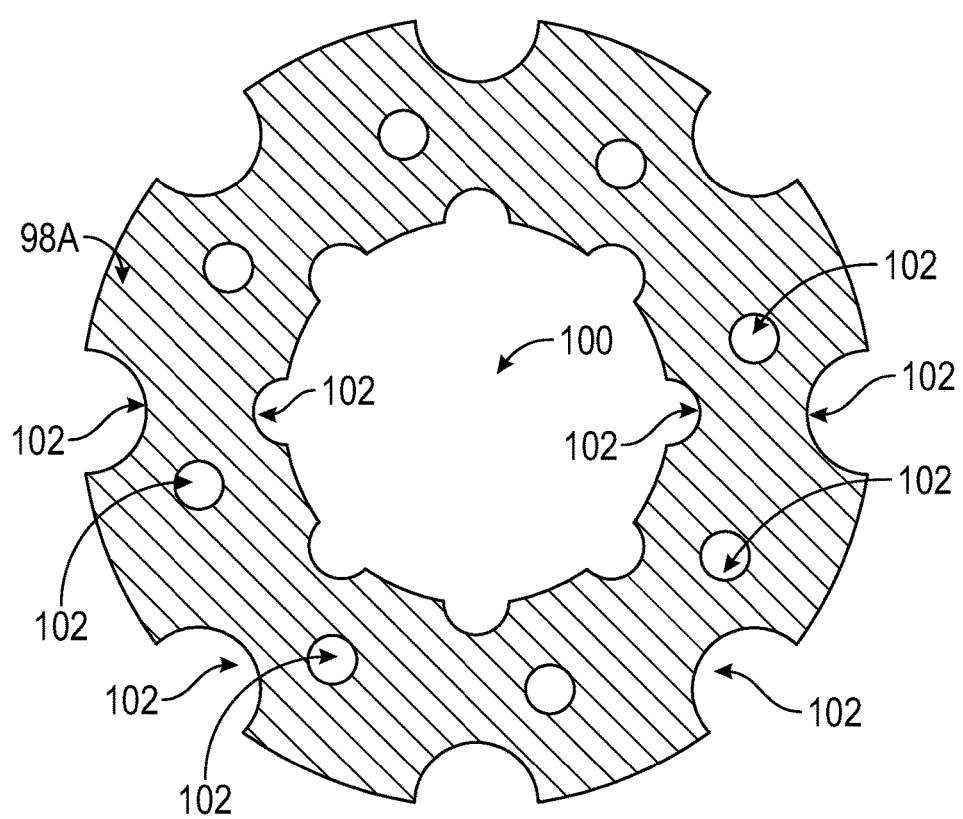
FIG. 7 is a front view of an example of a load transfer ring that may be disposed within an outer fitting annulus of a multi-annuli pipe fitting, in accordance with an embodiment of the present disclosure.

To help illustrate, an example of a load transfer ring 98A, which may be included in a multi-annuli pipe fitting 82, is shown in FIG. 7. As depicted, the load transfer ring 98A includes a central opening 100 that enables the load transfer ring 98A to be disposed around a corresponding annulus divider ring 84. Additionally, as depicted, the load transfer ring 98A includes fluid openings 102 that enable fluid to flow therethrough.

In particular, as in the depicted example, in some embodiments, a load transfer ring 98 may include one or more fluid openings 102 formed along its outer diameter. As in the depicted example, a load transfer ring 98 may additionally or alternatively include one or more enclosed fluid openings 102. Furthermore, in some embodiments, a load transfer ring 98 may additionally or alternatively include one or more fluid openings 102 formed along its inner diameter.

However, it should be appreciated that the depicted example is merely intended to be illustrative and not limiting. In particular, in other embodiments, fluid openings 102 may be formed in a load transfer ring 98 with a different configuration, for example, which includes fewer than twenty-four (e.g., twenty-three or one) fluid openings 102 or more than twenty-four (e.g., twenty-five, twenty-six, or more) fluid openings 102. Alternatively, as will be described in more detail below, in other embodiments, a load transfer ring 98 may not include a fluid opening 102, for example, when a vent port 96 is connected to an outer tubing annulus 25 of a pipe segment 20 via an opening formed in the outer barrier layer 28 of the pipe segment 20.

In any case, returning to FIG. 6, as in the depicted example, in some embodiments, a multi-annuli pipe fitting 82 may additionally include a vent assurance ring 104 disposed within its inner (e.g., venting) fitting annulus 88B. In particular, similar to the load transfer ring 98A of FIG. 7, to facilitate venting the inner fitting annulus 88B, in some such embodiments, the vent assurance ring 104 may include a central opening 100, which enables the vent assurance ring 104 to be disposed around the fitting body 43 (e.g., fitting tube 44), and one or more fluid openings 102, which enable fluid flow through the vent assurance ring 104. However, as in the example depicted in FIG. 6, the vent assurance ring 104 may not directly abut the inner surface 92 of the annulus divider ring 84, for example, to provide room for the annulus divider ring 84 to be compressed against an intermediate barrier layer 38 of a multi-annuli pipe segment 20.

Nevertheless, it should again be appreciated that the depicted example is merely intended to be illustrative and not limiting. In particular, in other embodiments, a multi-annuli pipe fitting 82 may not include a vent assurance ring 104 or include multiple vent assurance rings 104 disposed within an inner fitting annulus 88B. Additionally, in other embodiments, a multi-annuli pipe fitting 82 may include a vent assurance ring 104 disposed within its outer fitting annulus 88A.

In any case, as in the depicted example, to facilitate improving sealing integrity, in some embodiments, a multi-annuli pipe fitting 82 may include one or more discrete fitting seals 106. In particular, one or more outer fitting seals 106A may be disposed along the inner surface 86 of the fitting jacket 50 and, thus, compressed against the outer barrier layer 28 of pipe segment tubing 22, for example, to supplement sealing provided by engagement between the inner surface 86 of the fitting jacket 50 and the outer barrier layer 28. Additionally or alternatively, one or more inner fitting seals 106B may be disposed along the outer surface 94 of the fitting body 43 and, thus, compressed against the inner barrier layer 26 of pipe segment tubing 22, for example, to supplement sealing provided by engagement between the outer surface of the fitting body 43 and the inner barrier layer 26.

However, it should again be appreciated that the depicted example is merely intended to be illustrative and not limiting. In particular, in other embodiments, a multi-annuli pipe fitting 82 may include fewer than two (e.g., one or zero) outer fitting seals 106A or more than two (e.g., three, four, or more) outer fitting seals 106A. Additionally or alternatively, a multi-annuli pipe fitting 82 may include fewer than two (e.g., one or zero) inner fitting seals 106B or more than two (e.g., three, four, or more) inner fitting seals 106B. Furthermore, in some embodiments, a multi-annuli pipe fitting 82 may include one or more discrete fitting seals 106, which are implemented to be compressed between the inner surface 92 of an annulus divider ring 84 and the intermediate barrier layer 26 of a corresponding multi-annuli pipe segment 23, for example, to supplement sealing provided by engagement between the annulus divider ring 84 and the intermediate barrier layer 26 due to swaging. Moreover, as mentioned above, in other embodiments, a vent port 96 on a multi-annuli pipe fitting 82 may not be connected directly to an outer fitting annulus 88A of the multi-annuli pipe fitting 82, for example, instead being connected to the outer tubing annulus 25 of a corresponding multi-annuli pipe segment 23 via an opening formed through the outer barrier layer 28 of the multi-annuli pipe segment 23.

Figure 8:
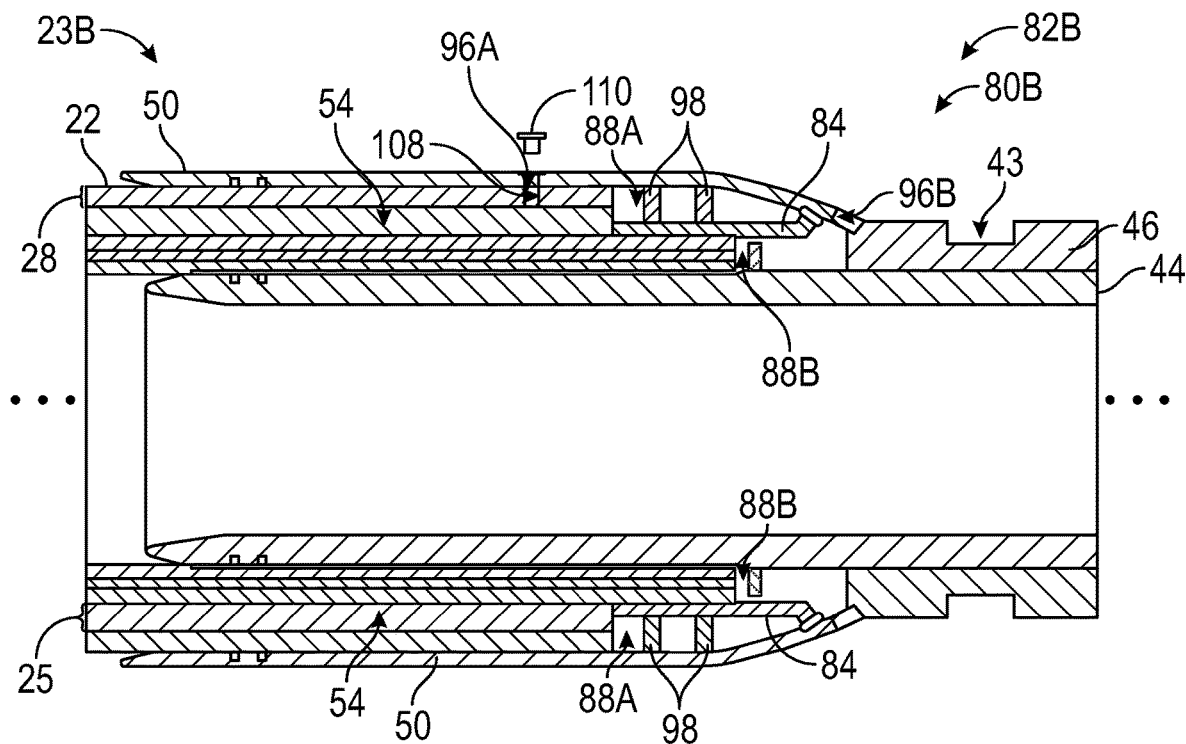
FIG. 8 is a cross-sectional view of another example of a portion of a multi-annuli pipe fitting secured to pipe segment tubing, in accordance with an embodiment of the present disclosure.

To help illustrate, another example of a portion 80B of a multi-annuli pipe fitting 82B and a multi-annuli pipe segment 23B are shown in FIG. 8. Similar to FIG. 6, as depicted, the multi-annuli pipe fitting 82B of FIG. 8 generally includes a fitting body 43, which includes a fitting tube 44 and a grab ring 46 disposed around the fitting tube 44, a fitting jacket 50 secured (e.g., welded) to the fitting body 43 to define a tubing cavity 54, and an annulus divider ring 84 secured to the fitting jacket 50 to divide the tubing cavity 54 into an outer fitting annulus 88A and an inner fitting annulus 88B. Additionally, similar to FIG. 6, the multi-annuli pipe fitting 82B includes an outer (e.g., first) vent port 96A and an inner (e.g., second) vent port 96B formed through its fitting jacket 50.

However, as depicted in FIG. 8, the outer vent port 96A is not connected directly to the outer fitting annulus 88A of the multi-annuli pipe fitting 82B. Instead, the outer vent port 96A is fluidly connected to an outer (e.g., reinforcement) tubing annulus 25 of the multi-annuli pipe segment 23B via an opening 108 formed through the outer barrier layer 28 of the multi-annuli pipe segment 23B. In other words, in such embodiments, fluid may be vented from the outer tubing annulus 25 of the multi-annuli pipe segment 23B without flowing through the outer fitting annulus 88A of the multi-annuli pipe fitting 82B. Thus, in some such embodiments, a load transfer ring 98 disposed within the outer fitting annulus 88A of the multi-annuli pipe fitting 82B may not include a fluid opening 102.

In any case, as in the depicted example, to facilitate selectively venting fluid via a vent port 96, in some embodiments, a multi-annuli pipe fitting 82 may additionally include one or more plugs 110. In particular, a plug 110 may be inserted (e.g., disposed) within a corresponding vent port 96 to block fluid venting via the vent port 96. For example, a plug 110 may be inserted into the outer vent port 96A to block venting of the outer fitting annulus 88A and the outer tubing annulus 25.

However, it should be appreciated that the depicted example is merely intended to be illustrative and not limiting. In particular, in other embodiments, a multi-annuli pipe fitting 82 may not include a plug 110. Additionally, as mentioned above, in other embodiments, a vent port 96 of a multi-annuli pipe fitting 82 may not be formed through a fitting jacket 50, for example, instead being formed in the fitting body 43 of the multi-annuli pipe fitting 82.

Figure 9:
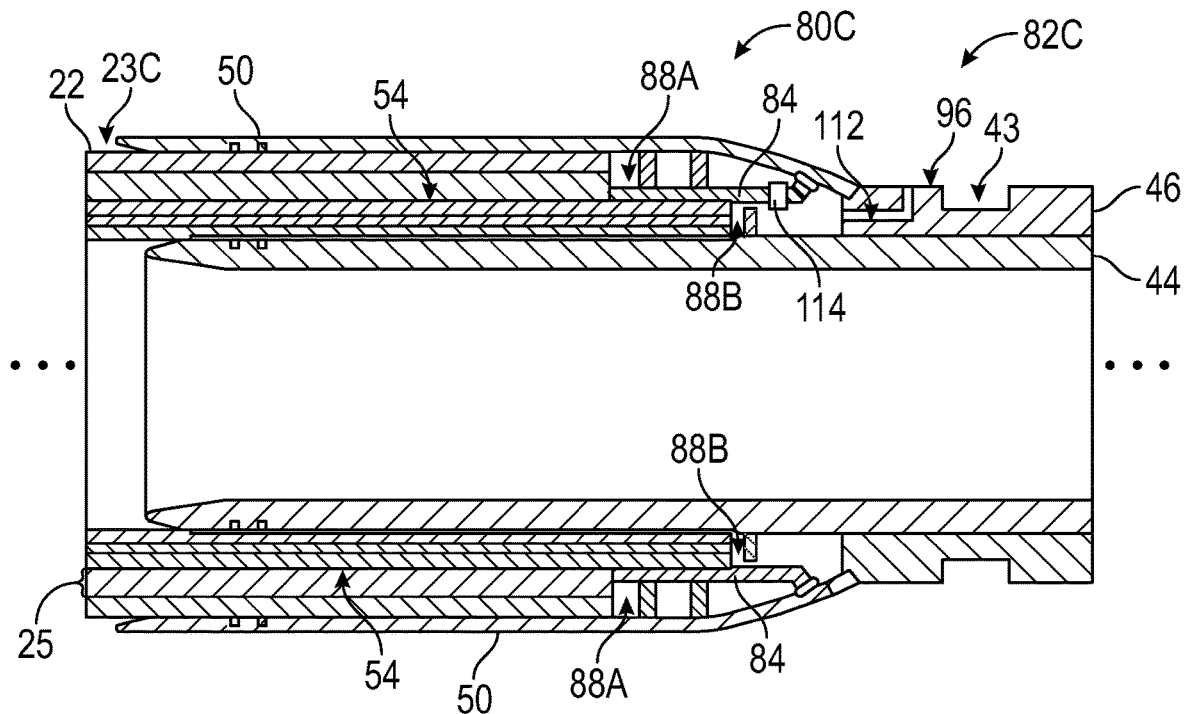
FIG. 9 is a cross-sectional view of a further example of a portion of a multi-annuli pipe fitting secured to pipe segment tubing, in accordance with an embodiment of the present disclosure.

To help illustrate, a further example of a portion 80C of a multi-annuli pipe fitting 82C and a multi-annuli pipe segment 23C are shown in FIG. 9. Similar to FIG. 6, as depicted, the multi-annuli pipe fitting 82C of FIG. 9 generally includes a fitting body 43, which includes a fitting tube 44 and a grab ring 46 disposed around the fitting tube 44, a fitting jacket 50 secured (e.g., welded) to the fitting body 43 to define a tubing cavity 54, and an annulus divider ring 84 secured to the fitting jacket 50 to divide the tubing cavity 54 into an outer fitting annulus 88A and an inner fitting annulus 88B. Additionally, similar to FIG. 6, the multi-annuli pipe fitting 82C includes vent port 96 fluidly connected to the inner fitting annulus 88B.

However, as depicted in FIG. 9, the vent port 96 is not formed through the fitting jacket 50. Instead, the vent port 96 is formed in the fitting body 43 (e.g., grab ring 46) and fluidly connected to the inner fitting annulus 88B via a fluid path 112 formed through the fitting body 43 (e.g., grab ring 46). Additionally, as depicted in FIG. 9, a vent port 96 is not connected directly to the outer fitting annulus 88A or the outer tubing annulus 25 of the pipe segment 20. Instead, a one-way valve 114 that enables fluid flow from the outer (e.g., reinforcement) fitting annulus 88A to the inner (e.g., venting) fitting annulus 88B while blocking fluid flow from the inner fitting annulus 88B to the outer fitting annulus 88A may be connected therebetween, for example, through the annulus divider ring 84. In this manner, the multi-annuli pipe fitting 82C may nevertheless facilitate blocking fluid flow from a venting tubing annulus 25B of a multi-annuli pipe segment 23 to a reinforcement tubing annulus 25A of the multi-annuli pipe segment 23.

However, it should be appreciated that the depicted example is merely intended to be illustrative and not limiting. In particular, as mentioned above, in some embodiments, a multi-annuli pipe fitting 82 may include multiple (e.g., two) fitting jackets 50 and, thus, multiple (e.g., two) annulus divider rings 84. Additionally, as mentioned above, in other embodiments, a vent port 96 on a multi-annuli pipe fitting 82 may not vent directly into external environmental conditions.

Figure 10:
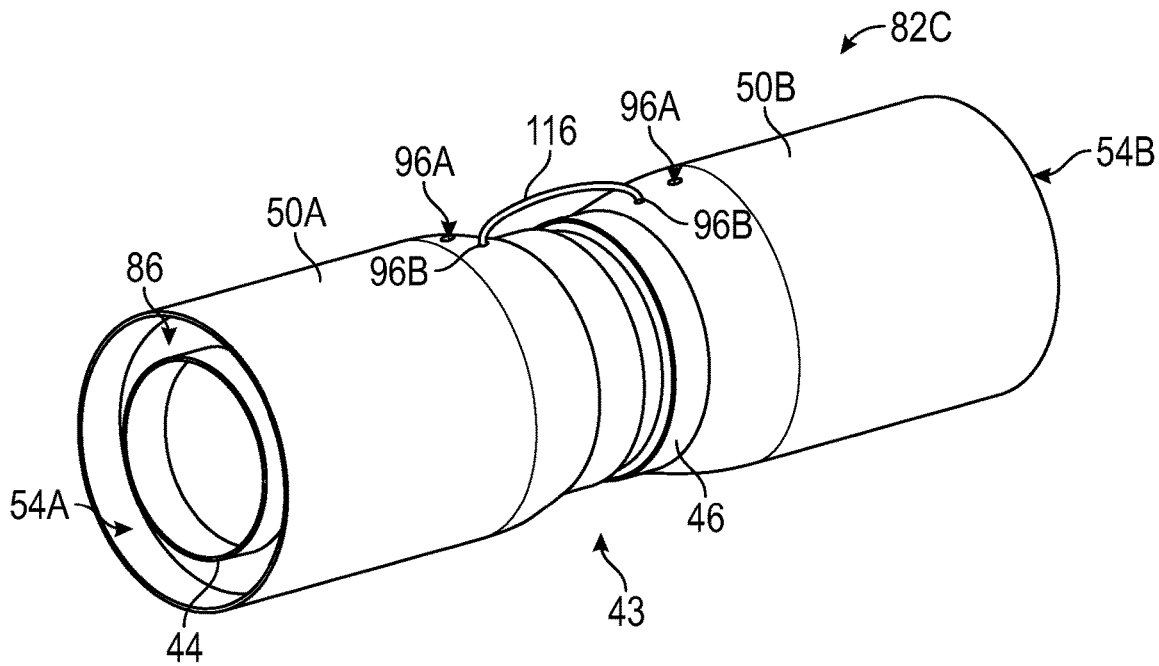
FIG. 10 is a perspective view of an example of a multi-annuli pipe fitting secured to pipe segment tubing, in accordance with an embodiment of the present disclosure.

To help illustrate, another example of a multi-annuli pipe fitting 84C is shown in FIG. 10. Similar to FIG. 5, as depicted, the multi-annuli pipe fitting 82C of FIG. 10 generally includes a fitting body 43, which includes a fitting tube 44 and a grab ring 46 disposed around the fitting tube 44, a first fitting jacket 50A secured (e.g., welded) to the fitting body 43 to define a first tubing cavity 54A, and a second fitting jacket 50B secured to the fitting body 43 to define a second tubing cavity 54B. Although obfuscated from view, similar to FIG. 6, the multi-annuli pipe fitting 82C of FIG. 10 includes a first annulus divider ring 84 secured to the inner surface 86 of the first fitting jacket 50A to divide the first tubing cavity 54A into a first outer fitting annulus 88A and a first inner fitting annulus 88B as well as a second annulus divider ring 84 secured to the inner surface 86 of the second fitting jacket 50B to divide the second tubing cavity 54B into a second outer fitting annulus 88A and a second inner fitting annulus 88B. Additionally, similar to FIG. 6, although partially obfuscated from view, the multi-annuli pipe fitting 82C of FIG. 10 includes a first outer vent port 96A formed through the first fitting jacket 50A to the first outer fitting annulus 88A, a first inner vent port 96B formed through the first fitting jacket 50A to the first inner fitting annulus 88B, a second outer vent port 96A formed through the second fitting jacket 50B to the second outer fitting annulus 88A, and a second inner vent port 96B formed through the second fitting jacket 50B to the second inner fitting annulus 88B.

However, as depicted in FIG. 10, the inner vent ports 96B of the multi-annuli pipe fitting 82C do not vent directly into external environmental conditions. Instead, the inner vent ports 96B are fluidly connected via one or more external fluid conduits 116, such as a hose. In other words, in such embodiments, the first inner fitting annulus 88B of the multi-annuli pipe fitting 82C may vent to the second inner fitting annulus 88B of the multi-annuli pipe fitting 82C or vice versa, for example, to enable fluid to be vented at a centralized location (e.g., pipe end fitting 18) instead of at each multi-annuli pipe fitting 82.

Nevertheless, it should be appreciated that the depicted example is merely intended to be illustrative and not limiting. In particular, in some embodiments, a multi-annuli pipe fitting 82 may additionally or alternatively include one or more external fluid conduits 116 that fluidly connect a first outer vent port 96A to a second outer vent port 96A. Furthermore, in other embodiments, one or more external fluid conduits 16 may fluidly connect an annulus fluid source or an annulus fluid vacuum to a vent port 96 on a multi-annuli pipe fitting 82, for example, to enable a corresponding fitting annulus 25 and, thus, a tubing annulus 88 of a corresponding multi-annuli pipe segment 23 to be actively vented (e.g., flushed or vacuumed). Alternatively, as mentioned above, in other embodiments, a multi-annuli pipe fitting 82 may not include a vent port 96.

Figure 11:
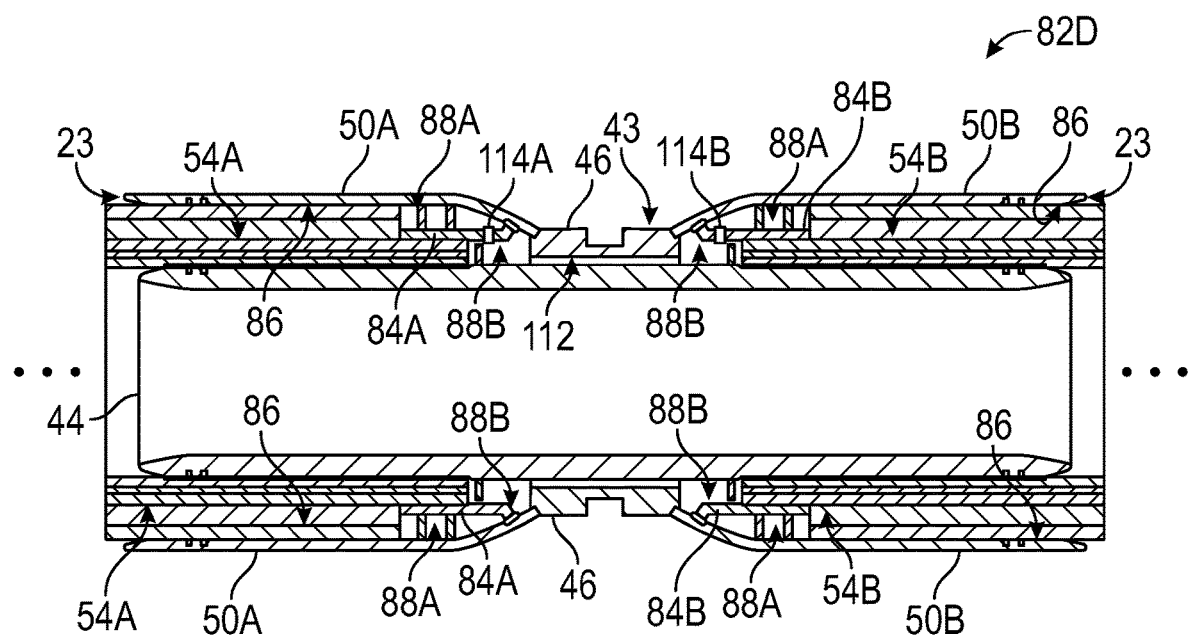
FIG. 11 is a cross-sectional view of another example of a multi-annuli pipe fitting, in accordance with an embodiment of the present disclosure.

To help illustrate, a further example of a multi-annuli pipe fitting 82D and multi-annuli pipe segments 23 are shown in FIG. 11. Similar to FIG. 5, as depicted, the multi-annuli pipe fitting 82D of FIG. 11 generally includes a fitting body 43, which includes a fitting tube 44 and a grab ring 46 disposed around the fitting tube 44, a first fitting jacket 50A secured (e.g., welded) to the fitting body 43 to define a first tubing cavity 54A, and a second fitting jacket 50B secured to the fitting body 43 to define a second tubing cavity 54B. Additionally, similar to FIG. 10, the multi-annuli pipe fitting 82D of FIG. 11 includes a first annulus divider ring 84A secured to the inner surface 86 of the first fitting jacket 50A to divide the first tubing cavity 54A into a first outer fitting annulus 88A and a first inner fitting annulus 88B as well as a second annulus divider ring 84B secured to the inner surface 86 of the second fitting jacket 50B to divide the second tubing cavity 54B into a second outer fitting annulus 88A and a second inner fitting annulus 88B.

Furthermore, similar to FIG. 9, to vent the first outer fitting annulus 88A, the multi-annuli pipe fitting 82D of FIG. 11 includes a first one-way valve 114A that enables fluid flow from the first outer (e.g., reinforcement) fitting annulus 88A to the first inner (e.g., venting) fitting annulus 88B while blocking fluid flow from the first inner fitting annulus 88B to the first outer fitting annulus 88A connected therebetween, for example, through the first annulus divider ring 84A. Moreover, to vent the second outer fitting annulus 88A, the multi-annuli pipe fitting 82D includes a second one-way valve 114B that enables fluid flow from the second outer (e.g., reinforcement) fitting annulus 88A to the second inner (e.g., venting) fitting annulus 88B while blocking fluid flow from the second inner fitting annulus 88B to the second outer fitting annulus 88A connected therebetween, for example, through the second annulus divider ring 84B.

However, as depicted in FIG. 11, the multi-annuli pipe fitting 82D does not include a vent port 96. Instead, the first inner fitting annulus 88B is fluidly connected to the second inner fitting annulus 88B via a fluid path 112 formed through the fitting body 43 (e.g., grab ring 46). Thus, in such embodiments, the first inner fitting annulus 88B of the multi-annuli pipe fitting 82D may vent to the second inner fitting annulus 88B of the multi-annuli pipe fitting 82D or vice versa, for example, to enable fluid to be vented at a centralized location (e.g., pipe end fitting 18) instead of at each multi-annuli pipe fitting 82.

Nevertheless, it should be appreciated that the depicted example is merely intended to be illustrative and not limiting. In particular, in other embodiments, the multi-annuli pipe fitting 82D may include a first outer vent port 96A formed through the first fitting jacket 50A to the first outer fitting annulus 88A and a second outer vent port 96A formed through the second fitting jacket 50B to the second outer fitting annulus 88A. In fact, to facilitate venting at a centralized location, in some embodiments, a first subset of multi-annuli pipe fittings 82 (e.g., pipe end fittings 18) in a pipeline system 10 may include vent ports 96 while a second subset of multi-annuli pipe fittings 82 (e.g., midline pipe fittings 18) may not include vent ports 96. In any case, in this manner, a multi-annuli pipe fitting 82 may be implemented (e.g., manufactured) and/or deployed (e.g., installed) at a multi-annuli pipe segment 23 to facilitate improving pipeline tensile strength and/or hoop strength, for example, by providing fluid isolation between a venting fitting annulus 88 and a reinforcement fitting annulus 88 of the multi-annuli pipe fitting 82 and, thus, fluid isolation between a venting tubing annulus 25B and a reinforcement tubing annulus 25A of the multi-annuli pipe segment 23.

Figure 12:
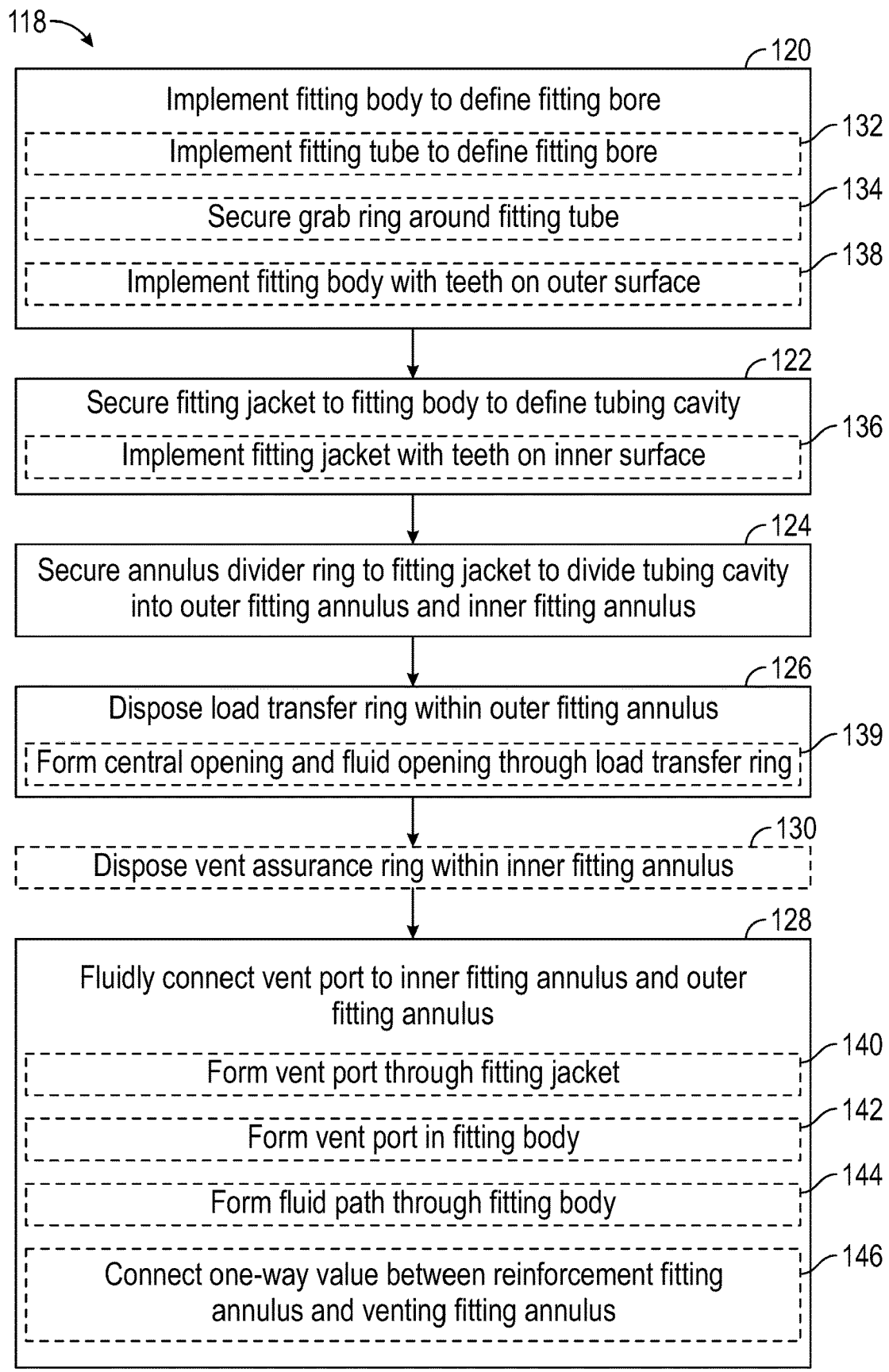
FIG. 12 is a flow diagram of an example of a process for implementing (e.g., manufacturing) a multi-annuli pipe fitting, in accordance with an embodiment of the present disclosure.

To help further illustrate, an example of a process 118 for implementing (e.g., manufacturing) a multi-annuli pipe fitting 82 is described in FIG. 12. Generally, the process 118 includes implementing a fitting body (process block 120), securing a fitting jacket to the fitting body to define a tubing cavity (process block 122), and securing an annulus divider ring to the fitting jacket to divide the tubing cavity into an outer fitting annulus and an inner fitting annulus (process block 124). Additionally, the process 118 generally includes disposing a load transfer ring within the outer fitting annulus (process block 126) and fluidly connecting a vent port to the inner fitting annulus and the outer fitting annulus (process block 128).

Although described in a specific order, which corresponds with an embodiment of the present disclosure, it should be appreciated that the example process 118 is merely intended to be illustrative and not limiting. In particular, in other embodiments, a process 118 for implementing a multi-annuli pipe fitting 82 may include one or more additional process blocks and/or omit one or more of the depicted process blocks. For example, some embodiments of the process 118 may additionally include disposing a vent assurance ring within the inner fitting annulus (process block 130) while other embodiments of the process 118 do not. Moreover, in other embodiments, one or more of the depicted process blocks may be performed in a different order, for example, such that annulus divider ring is secured to the fitting jacket before the fitting jacket is secured to the fitting body.

In any case, as described above, a multi-annuli pipe fitting 82 generally includes a fitting body 43 that is implemented to define a fitting bore 48 through the multi-annuli pipe fitting 82. As such, implementing a multi-annuli pipe fitting 82 may generally include implementing a fitting body 43 to define a fitting bore 48 (process block 120). In particular, in some embodiments, the fitting body 43 may be formed out of metal, such as carbon steel, stainless steel, duplex stainless steel, super duplex stainless steel, or any combination thereof Additionally, as described above, in some embodiments, the fitting body 43 of a multi-annuli pipe fitting 82 may include a fitting tube 44, which defines its fitting bore 48. In other words, in such embodiments, implementing a fitting body 43 of a multi-annuli pipe fitting 82 may include implementing (e.g., forming) a fitting tube 44 to define its fitting bore 48 (process block 132). Furthermore, as described above, in some embodiments, the fitting body 43 of a multi-annuli pipe fitting 82 may include a grab ring 46 secured around its fitting tube 44, for example, to enable a swage machine 39 to be connected to the multi-annuli pipe fitting 82. In other words, in such embodiments, implementing the fitting body 43 may include securing a grab ring 46 around (e.g., surrounding) its fitting tube 44 (process block 134).

In addition to a fitting body 43, as described above, a multi-annuli pipe fitting 82 may generally include one or more fitting jackets 50 secured to the fitting body 43 to define corresponding tubing cavities 54. As such, implementing a multi-annuli pipe fitting 82 may generally include securing (e.g., welding) a fitting jacket 50 to its fitting body 43 (e.g., grab ring 46) to define a tubing cavity 54 (process block 122). As described above, pipe segment tubing 22 disposed within the tubing cavity 54 may be compressed between the inner surface 86 of the fitting jacket 50 and the outer surface 94 of the fitting body 43 (e.g., fitting tube 44) to facilitate securing and sealing the pipe segment tubing 22 in the multi-annuli pipe fitting 82. In fact, to facilitate improving securement strength, in some embodiments, the fitting jacket 50 may include teeth implemented on its inner surface 86 (process block 136), the fitting body 43 may include teeth implemented on its outer surface 94 (process block 138), or both.

Furthermore, as described above, a multi-annuli pipe fitting 82 generally includes one or more annulus divider rings 84, which are each secured to the inner surface 86 of a corresponding fitting jacket 50 to divide a corresponding tubing cavity 54 into an outer (e.g., reinforcement) fitting annulus 88A and an inner (e.g., venting) fitting annulus 88B. As such, implementing a multi-annuli pipe fitting 82 may generally include securing (e.g., welding) an annulus divider ring 84 to the inner surface 86 of a fitting jacket 50, for example, such that the annulus divider ring 84 is substantially parallel to the fitting jacket 50 (process block 124). As described above, to facilitate sealing the inner fitting annulus 88B from the outer fitting annulus 88A, the annulus divider ring 84 may be conformally deformed around the intermediate barrier layer 38 of a multi-annuli pipe segment 23, which separates the inner (e.g., venting) tubing annulus 25 of the multi-annuli pipe segment 23 from the outer (e.g., reinforcement) tubing annulus 25 of the multi-annuli pipe segment 23. In fact, as described above, the annulus divider ring 84 may be conformally deformed around the intermediate barrier layer 38 using a portion of swaging force used to conformally deform the fitting jacket 50 around the tubing 22 of the multi-annuli pipe segment 23.

To facilitate using a portion of swaging force applied to a fitting jacket 50 to conformally deform a corresponding annulus divider ring 84, as described above, a multi-annuli pipe fitting 82 may generally include one or more load transfer rings 98 disposed within an outer fitting annulus 88A, which is defined between the fitting jacket 50 and the annulus divider ring 84. As such, implementing a multi-annuli pipe fitting 82 may generally include disposing one or more load transfer rings 98 within an outer fitting annulus 88A of the multi-annuli pipe fitting 82 (process block 126). In particular, in some embodiments, the load transfer ring 98 may be disposed within the outer fitting annulus 88A such that its outer surface abuts the inner surface 86 of the fitting jacket 50 and its inner surface abuts the outer surface 90 of the annulus divider ring 84. Additionally, in some embodiments, a load transfer ring 98 may be formed to include a central opening 100, which enables the load transfer ring 98 to be disposed around a corresponding annulus divider ring 84, and one or more fluid openings 102, which enable fluid flow through the load transfer ring 98 (process block 139).

Furthermore, as described above, in some embodiments, a multi-annuli pipe fitting 82 may include a vent assurance ring 104 disposed within its inner fitting annulus 88B. In other words, in such embodiments, implementing a multi-annuli pipe fitting 82 may include disposing a vent assurance ring 104 within the inner fitting annulus 88B of the multi-annuli pipe fitting 82 (process block 130). In particular, in some embodiments, the vent assurance ring 104 may be disposed in the inner fitting annulus 88B such that its outer surface does not directly abut the inner surface 92 of a corresponding annulus divider ring 84, for example, to provide room for the annulus divider ring 84 to be compressed against an intermediate barrier layer 38 of a multi-annuli pipe segment 23.

Moreover, as described above, the fitting annuli 88 of a multi-annuli pipe fitting 82 may be fluidly connected to one or more vent ports 96 to facilitate venting fluid from tubing annuli 25 of a corresponding multi-annuli pipe segment 23. As such, implementing a multi-annuli pipe fitting 82 may generally include fluidly connecting one or more vent ports 96 to an inner fitting annulus 88B and an outer fitting annulus 88A of the multi-annuli pipe fitting 88 (process block 128).

In particular, as described above, in some embodiments, a fitting annulus 88 of a multi-annuli pipe fitting 82 may be fluidly connected to a vent port 96 included in the multi-annuli pipe fitting 82. For example, in some such embodiments, the fitting annulus 88 may be fluidly connected to a vent port 96 formed through a corresponding fitting jacket 50 of the multi-annuli pipe fitting 82. In other words, in such embodiments, fluidly connecting a vent port 96 of a multi-annuli pipe fitting 82 to a fitting annulus 88 may include forming a vent port 96 through a corresponding fitting jacket 50 of the multi-annuli pipe fitting 82 (process block 140).

However, as described above, in other such embodiments, a vent port 96 of a multi-annuli pipe fitting 82 may be formed in the fitting body 43 of the multi-annuli pipe fitting 82. In particular, in such embodiments, a fitting annulus 88 of the multi-annuli pipe fitting 82 may be fluidly connected to the vent port 96 via a fluid path 112 formed through the fitting body 43. In other words, in such embodiments, fluidly connecting a vent port 96 of a multi-annuli pipe fitting 82 to a fitting annulus 88 may include forming the vent port 96 in the fitting body 43 (e.g., grab ring 46) of the multi-annuli pipe fitting 82 (process block 142) and forming a fluid path 112 through the fitting body 43 (e.g., grab ring 46) from the fitting annulus 88 to the vent port 96 (process block 144).

Moreover, as described above, in some embodiments, a fitting annulus 88 of a multi-annuli pipe fitting 82 may not vent directly to external environmental conditions. Instead, in some such embodiments, the fitting annulus 88 may be fluidly connected to another fitting annulus 88 of the same type via a fluid path 112 formed through the fitting body 43 of the multi-annuli pipe fitting 82, for example, to enable fluid to be vented via a vent port 96 of another pipe fitting 18. In other words, in such embodiments, fluidly connecting a vent port 96 to a fitting annulus 88 of a multi-annuli pipe fitting 82 may include forming a fluid path 112 through the fitting body 43 (e.g., grab ring 46) of the multi-annuli pipe fitting 82 from the fitting annulus 88 to another fitting annulus 88 of the same type (process block 144).

In other such embodiments, as described above, a (e.g., outer) reinforcement fitting annulus 88 may vent fluid to a (e.g., inner) venting fitting annulus 88 via a one-way valve 114, which blocks fluid flow from the venting fitting annulus 88 to the reinforcement fitting annulus 88, for example, to enable the fluid to be vented via a vent port 96 fluidly connected to the venting fitting annulus 88. In other words, in such embodiments, fluidly connecting a vent port 96 to a reinforcement fitting annulus 88 of a multi-annuli pipe fitting 82 may include connecting a one-way valve 114 between the reinforcement fitting annulus 88 and a venting fitting annulus 88, for example, through a corresponding annulus divider ring 84 (process block 146). In this manner, a multi-annuli pipe fitting 82 may be implemented (e.g., manufactured) to enable the multi-annuli pipe fitting 82 to be deployed (e.g., installed) at a multi-annuli pipe segment 23 such that the multi-annuli pipe fitting 82 facilitates improving pipeline tensile strength and/or hoop strength, for example, by providing fluid isolation between a venting fitting annulus 88 and a reinforcement fitting annulus 88 of the multi-annuli pipe fitting 82 and, thus, fluid isolation between a venting tubing annulus 25B and a reinforcement tubing annulus 25A of the multi-annuli pipe segment 23.

Figure 13:
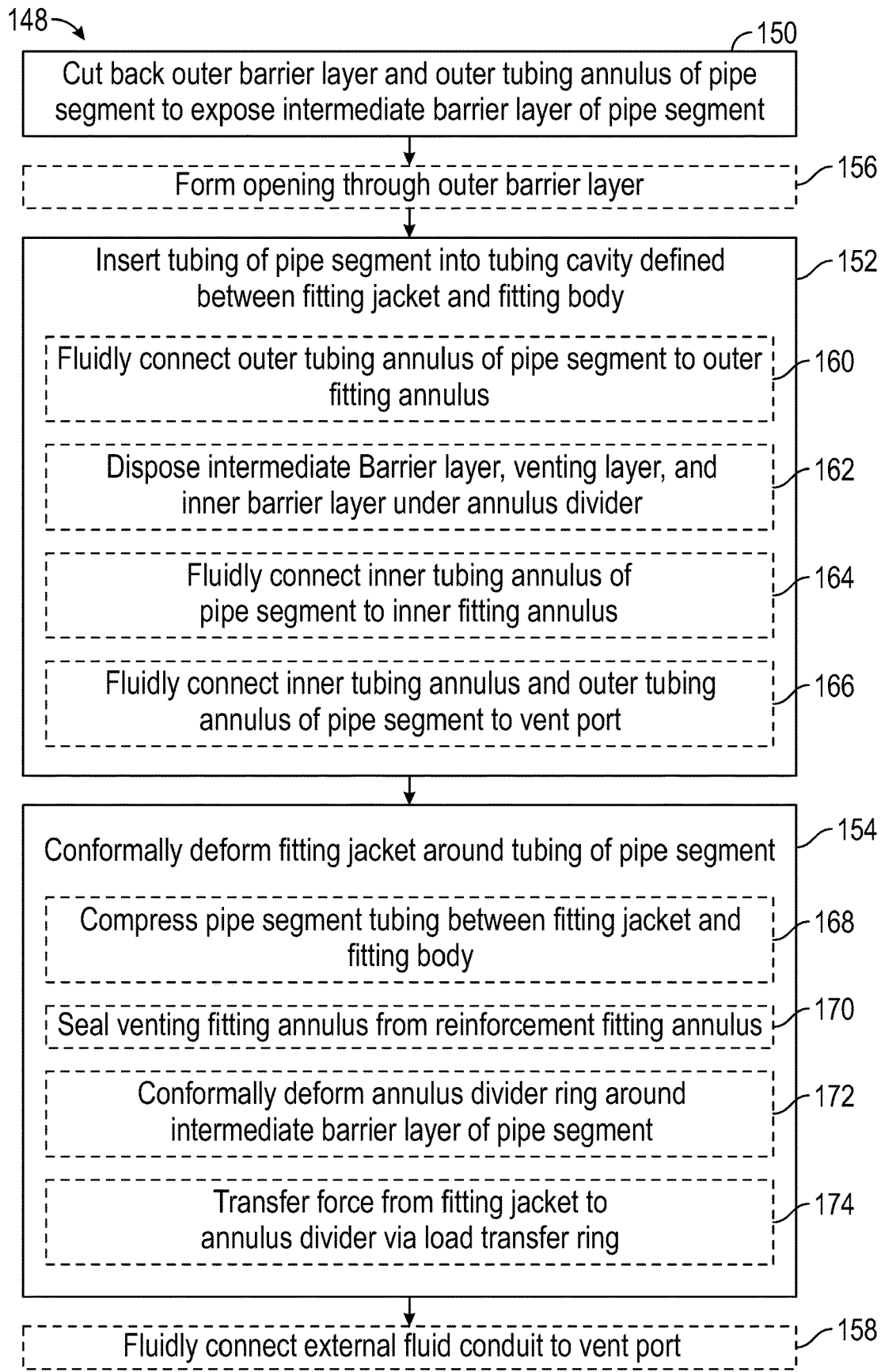
FIG. 13 is a flow diagram of an example of a process for deploying (e.g., installing) a multi-annuli pipe fitting at a pipe segment, in accordance with an embodiment of the present disclosure.

To help further illustrate, an example of a process 148 for deploying (e.g., installing) a multi-annuli pipe fitting 82 at a pipe segment 20 is described in FIG. 13. Generally, the process 148 includes cutting back an outer barrier layer and an outer fitting annulus of a pipe segment to expose an intermediate barrier layer of the pipe segment (process block 150). Additionally, the process 148 generally includes inserting tubing of the pipe segment into a tubing cavity defined between a fitting jacket and a fitting body (process block 152) and conformally deforming the fitting jacket around the tubing of the pipe segment (process block 154).

Although described in a specific order, which corresponds with an embodiment of the present disclosure, it should be appreciated that the example process 148 is merely intended to be illustrative and not limiting. In particular, in other embodiments, a process 148 for deploying a multi-annuli pipe fitting 82 at a pipe segment 20 may include one or more additional process blocks and/or omit one or more of the depicted process blocks. For example, some embodiments of the process 148 may additionally include forming an opening through the outer barrier layer of the pipe segment (process block 156) while other embodiments of the process 148 do not. As another example, some embodiments of the process 148 may additionally include fluidly connecting an external fluid conduit between vent ports (process block 158) while other embodiments of the process 148 do not. Moreover, in other embodiments, one or more of the depicted process blocks may be performed in a different order.

In any case, as described above, the tubing 22 of a pipe segment 20 may generally be secured and sealed within a tubing cavity 54 of a multi-annuli pipe fitting 82, which is defined between a fitting jacket 50 and the fitting body 43 (e.g., fitting tube 44) of the multi-annuli pipe fitting 82. As such, deploying a multi-annuli pipe fitting 82 at a multi-annuli pipe segment 23 may generally include inserting the tubing 22 of the multi-annuli pipe segment 23 into a corresponding tubing cavity 54 of the multi-annuli pipe fitting 82 (process block 152). To facilitate sealing a reinforcement tubing annulus 25A of a multi-annuli pipe segment 23 from a venting tubing annulus 25B of the multi-annuli pipe segment 23 and, thus, improving tensile strength and/or hoop strength of the multi-annuli pipe segment 23, as described above, a multi-annuli pipe fitting 82 may include an annulus divider ring 84 secured to a fitting jacket 50 to divide a corresponding tubing cavity 54 into an outer (e.g., reinforcement) fitting annulus 88A and an inner (e.g., venting) fitting annulus 88B. In particular, the tubing 22 of the multi-annuli pipe segment 23 may be inserted such that one or more intermediate layers 34 in its outer (e.g., reinforcement) tubing annulus 25 open to the outer fitting annulus 88A, thereby fluidly connecting the outer tubing annulus 25 to the outer fitting annulus 88A (process block 160).

Additionally, as described above, the tubing 22 of a multi-annuli pipe segment 23 may be inserted into a tubing cavity 54 of a multi-annuli pipe fitting 82 such that its inner barrier layer 26, each intermediate layer 34 in an inner tubing annulus 25, and its intermediate barrier layer 38 are disposed within an inner fitting annulus 88B of the multi-annuli pipe fitting 82 and, thus, under a corresponding annulus divider ring 84 (process block 162). In this manner, the inner tubing annulus 25 may be fluidly connected to the inner fitting annulus 88B (process block 164). To enable the intermediate barrier layer 38 to be disposed under the annulus divider ring 84, as described above, deploying a multi-annuli pipe fitting 82 at a multi-annuli pipe segment 23 may include cutting back the outer barrier layer 28 and each intermediate layer 34 in an outer tubing annulus 25 of the multi-annuli pipe segment 23 to expose a portion of an intermediate barrier layer 38 (process block 150).

Furthermore, to facilitate venting fluid, as described above, fluidly connecting an inner tubing annulus 25 of a multi-annuli pipe segment 23 to an inner fitting annulus 88B of a multi-annuli pipe fitting 82 and fluidly connecting an outer tubing annulus 25 of the multi-annuli pipe segment 23 to an outer fitting annulus 88A of the multi-annuli pipe fitting 82 may fluidly connect the inner tubing annulus 25 and the outer tubing annulus 25 to one or more vent ports 96, for example, on the multi-annuli pipe fitting 82 or a different pipe fitting 18 (process block 166). In particular, in some embodiments, a vent port 96 of a multi-annuli pipe fitting 82 may be formed through a fitting jacket 50 to enable the vent port 96 to be fluidly connected to a corresponding fitting annulus 88. More specifically, in some such embodiments, a vent port 96 may be fluidly connected to an outer tubing annulus 25 and, thus, a corresponding outer fitting annulus 88A via an opening 108 formed through the outer barrier layer 28 of the pipe segment 20. In other words, to facilitate fluidly connected a vent port 96 to an outer fitting annulus 88A, in such embodiments, deploying a multi-annuli pipe fitting 82 at a multi-annuli pipe segment 23 may include forming an opening 108 through the outer barrier layer 28 of the multi-annuli pipe segment 23 (process block 156).

Moreover, as described above, in some embodiments, a vent port 96 on a multi-annuli pipe fitting 82 may not vent directly to external environmental conditions. Instead, in some such embodiments, a vent port 96 may vent to another vent port 96 and, thus, a corresponding fitting annulus 88 via one or more external fluid conduits 116, such as a hose, for example, to enable fluid to be vented at a centralized location (e.g., pipe end fitting 18) instead of at each multi-annuli pipe fitting 82. In other words, in such embodiments, deploying a multi-annuli pipe fitting 82 at a multi-annuli pipe segment 23 may include fluidly connecting an external fluid conduit 116 between different vent ports 96 (process block 158).

Additionally, as mentioned above, in some embodiments, an annulus fluid source or an annulus fluid vacuum may be fluidly connected to a vent port 96 of a multi-annuli pipe fitting 82 via one or more external fluid conduits 116. In particular, in such embodiments, the annulus fluid source or the annulus fluid vacuum may be operated to actively vent (e.g., flush or vacuum) fluid from a corresponding tubing annulus 25 of a multi-annuli pipe segment 23 via the one or more external fluid conduits 116, which, at least in some instances, may facilitate improving tensile strength and/or hoop strength of the multi-annuli pipe segment 23, for example, due to potentially corrosive fluid being actively vented from a reinforcement tubing annulus 25A of the multi-annuli pipe segment 23. In other words, in such embodiments, deploying a multi-annuli pipe fitting 82 at a multi-annuli pipe segment 23 may include fluidly connecting an external fluid conduit 116 between a vent port 96 and an annulus fluid source or an annulus fluid vacuum (process block 158).

In any case, as described above, after the tubing 22 of a multi-annuli pipe segment 23 is inserted into a tubing cavity 54 of a multi-annuli pipe fitting 82, a corresponding fitting jacket 50 may be conformally deformed around the pipe segment tubing 22 to facilitate securing and sealing the pipe segment tubing 22 in the multi-annuli pipe fitting 82. As such, deploying a multi-annuli pipe fitting 82 at a multi-annuli pipe segment 23 may generally include conformally deforming a fitting jacket 50 around the tubing 22 of the multi-annuli pipe segment 23 (process block 154). In particular, the fitting jacket 50 may be conformally deformed such that the pipe segment tubing 22 is compressed between the fitting jacket 50 and the fitting body 43 of the multi-annuli pipe fitting 82, thereby securing the pipe segment tubing 22 in the multi-annuli pipe fitting 82, for example, while using engagement between the inner surface of the fitting jacket 50 and the outer barrier layer 28 of the pipe segment tubing 22 to facilitate sealing tubing annuli 25 from external environmental conditions and using engagement between the inner barrier layer 26 of the pipe segment tubing 22 and the outer surface of the fitting body 43 to facilitate sealing the tubing annuli 25 from the pipe bore 32 of the multi-annuli pipe segment 23 (process block 168).

To facilitate improving tensile strength and/or hoop strength of a multi-annuli pipe segment 23, as described above, a reinforcement (e.g., outer) fitting annulus 88 of a multi-annuli pipe fitting 82 may be sealed from a venting (e.g., inner) fitting annulus 88 of the multi-annuli pipe fitting 82 (process block 170). In particular, the reinforcement fitting annulus 88 may be sealed from the venting fitting annulus 88 at least in part by conformally deforming a corresponding annulus divider ring 84 around an intermediate barrier layer 38 of the multi-annuli pipe segment 23 (process block 172). In fact, an annulus divider ring 84 may be conformally deformed at least in part by transferring a portion of swaging force applied to a corresponding fitting jacket 50 to the annulus divider ring 84 via one or more load transfer rings 98, which are disposed within the outer fitting annulus 88A and, thus, between the fitting jacket 50 and the annulus divider ring 84 (process block 174). In this manner, a multi-annuli pipe fitting 82 may be deployed (e.g., installed) at a multi-annuli pipe segment 23 such that the multi-annuli pipe fitting 82 facilitates improving pipeline tensile strength and/or hoop strength, for example, by providing fluid isolation between a venting fitting annulus 88 and a reinforcement fitting 88 of the multi-annuli pipe fitting 82 and, thus, fluid isolation between a venting tubing annulus 25B and a reinforcement tubing annulus 25A of the multi-annuli pipe segment 23.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipeline system comprising:
   a multi-annuli pipe segment, wherein the multi-annuli pipe segment comprises:
   an inner barrier layer that defines a pipe bore;
   a first intermediate layer that defines a first fluid conduit in an inner tubing annulus implemented around the inner barrier layer;
   an intermediate barrier layer disposed around the inner tubing annulus;
   a second intermediate layer that defines a second fluid conduit in an outer tubing annulus implemented around the intermediate barrier layer; and
   an outer barrier layer disposed around the outer tubing annulus; and
   a multi-annuli pipe fitting secured to the multi-annuli pipe segment, wherein the multi-annuli pipe fitting comprises:
   a fitting body that defines a fitting bore fluidly connected to the pipe bore of the multi-annuli pipe segment;
   a fitting jacket secured to the fitting body to define a tubing cavity, wherein the fitting jacket is conformally deformed around the outer barrier layer of the multi-annuli pipe segment to facilitate securing the multi-annuli pipe fitting to the multi-annuli pipe segment;
   an annulus divider ring secured to the fitting jacket to divide the tubing cavity into an outer fitting annulus that is fluidly connected to the outer tubing annulus of the multi-annuli pipe segment and an inner fitting annulus that is fluidly connected to the inner tubing annulus of the multi-annuli pipe segment, wherein the annulus divider ring is conformally deformed around the intermediate barrier layer of the multi-annuli pipe segment to facilitate blocking fluid flow from the inner fitting annulus to the outer fitting annulus;
   a first vent port formed through the fitting jacket to the inner fitting annulus; and a second vent port formed through the fitting jacket to the outer fitting annulus.

2. The pipeline system of claim 1, wherein the multi-annuli pipe fitting comprises a load transfer ring disposed within the outer fitting annulus to enable the annulus divider ring to be conformally deformed around the intermediate barrier layer of the multi-annuli pipe segment at least in part by transferring from the fitting jacket to the annulus divider ring a portion of swaging force applied to the fitting jacket to conformally deform the fitting jacket around the outer barrier layer of the multi-annuli pipe segment.

3. The pipeline system of claim 2, wherein the load transfer ring comprises:
   a central opening that enables the load transfer ring to be disposed around the annulus divider ring; and
   a fluid opening that enables fluid flow through the load transfer ring to the second vent port.

4. The pipeline system of claim 1, comprising another multi-annuli pipe segment, wherein:
   the other multi-annuli pipe segment comprises:
      another inner barrier layer that defines another pipe bore;
      another first intermediate layer that defines another first fluid conduit in another inner tubing annulus implemented around the other inner barrier layer;
      another intermediate barrier layer disposed around the other inner tubing annulus;
      another second intermediate layer that defines another second fluid conduit in another outer tubing annulus implemented around the other intermediate barrier layer; and
      another outer barrier layer disposed around the other outer tubing annulus; and
   the multi-annuli pipe fitting comprises:
      another fitting jacket secured to the fitting body to define another tubing cavity, wherein the other fitting jacket is conformally deformed around the other outer barrier layer of the other multi-annuli pipe segment to facilitate securing the multi-annuli pipe fitting to the other multi-annuli pipe segment; and
      another annulus divider ring secured to the other fitting jacket to divide the other tubing cavity into another outer fitting annulus that is fluidly connected to the other outer tubing annulus of the other multi-annuli pipe segment and another inner fitting annulus that is fluidly connected to the other inner tubing annulus of the other multi-annuli pipe segment, wherein the other annulus divider ring is conformally deformed around the other intermediate barrier layer of the other multi-annuli pipe segment to facilitate blocking fluid flow from the other inner fitting annulus to the other outer fitting annulus.

5. The pipeline system of claim 1, wherein the fitting body of the multi-annuli pipe fitting comprises:
   a fitting tube that defines the fitting bore; and
   a grab ring disposed around the fitting tube to enable a swage machine to be secured to the multi-annuli pipe fitting.

6. The pipeline system of claim 1, wherein:
   the outer barrier layer and the second intermediate layer of the multi-annuli pipe segment are cut back to expose a portion of the intermediate barrier layer; and
   the intermediate barrier layer, the first intermediate layer, and the inner barrier layer of the multi-annuli pipe segment are disposed between the annulus divider ring and the fitting body.

7. The pipeline system of claim 1, wherein the multi-annuli pipe fitting comprises:
   an outer fitting seal compressed between the fitting jacket and the outer barrier layer of the multi-annuli pipe segment to facilitate sealing the outer fitting annulus of the multi-annuli pipe fitting from external environmental conditions; or
   an inner fitting seal compressed between the fitting body and the inner barrier layer of the multi-annuli pipe segment to facilitate sealing the inner fitting annulus of the multi-annuli pipe fitting from the pipe bore of the multi-annuli pipe segment; or
   both.

8. A pipeline system comprising a pipe fitting, wherein the pipe fitting comprises:
   a fitting tube that defines a fitting bore to be fluidly connected to a pipe bore defined by pipe segment tubing;
   a grab ring disposed around the fitting tube to enable a swage machine to be connected to the pipe fitting;
   a fitting jacket secured to the grab ring to define a tubing cavity between the fitting jacket and the fitting tube, wherein the fitting jacket is configured to be conformally deformed around an outer barrier layer of the pipe segment tubing to facilitate securing the pipe fitting to the pipe segment tubing;
   an annulus divider ring secured to an inner surface of the fitting jacket to divide the tubing cavity into a reinforcement fitting annulus that is configured to be fluidly connected to a reinforcement tubing annulus of the pipe segment tubing and a venting fitting annulus that is configured to be fluidly connected to a venting tubing annulus of the pipe segment tubing, wherein the venting tubing annulus and the reinforcement tubing annulus are separated in the pipe segment tubing by an intermediate barrier layer;
   a load transfer ring disposed between the fitting jacket and the annulus divider ring, wherein the load transfer ring is configured to transfer a portion of swaging force applied to the fitting jacket to conformally deform the fitting jacket around the outer barrier layer of the pipe segment tubing from the fitting jacket to the annulus divider ring to facilitate blocking fluid flow from the venting fitting annulus of the pipe fitting to the reinforcement fitting annulus at least in part by using the portion of the swaging force to conformally deform the annulus divider ring around the intermediate barrier layer of the pipe segment tubing;
   a first vent port formed through the fitting jacket to the reinforcement fitting annulus of the pipe fitting; and
   a second vent port formed through the fitting jacket to the venting fitting annulus of the pipe fitting.

9. The pipeline system of claim 8, wherein the load transfer ring of the pipe fitting comprises:
   a central opening that enables the load transfer ring to be disposed around the annulus divider ring; and
   a fluid opening that enables fluid flow through the load transfer ring to the first vent port.

10. A pipeline system comprising:
   a multi-annuli pipe segment, wherein the multi-annuli pipe segment comprises:
      an inner barrier layer that defines a pipe bore;
      a first intermediate layer that defines a first fluid conduit in an inner tubing annulus implemented around the inner barrier layer;
      an intermediate barrier layer disposed around the inner tubing annulus;

a second intermediate layer that defines a second fluid conduit in an outer tubing annulus implemented around the intermediate barrier layer; and an outer barrier layer disposed around the outer tubing annulus; and a multi-annuli pipe fitting secured to the multi-annuli pipe segment, wherein the multi-annuli pipe fitting comprises:

a fitting body that defines a fitting bore fluidly connected to the pipe bore of the multi-annuli pipe segment;

a fitting jacket secured to the fitting body to define a tubing cavity, wherein the fitting jacket is conformally deformed around the outer barrier layer of the multi-annuli pipe segment to facilitate securing the multi-annuli pipe fitting to the multi-annuli pipe segment;

an annulus divider ring secured to the fitting jacket to divide the tubing cavity into an outer fitting annulus that is fluidly connected to the outer tubing annulus of the multi-annuli pipe segment and an inner fitting annulus that is fluidly connected to the inner tubing annulus of the multi-annuli pipe segment, wherein the annulus divider ring is conformally deformed around the intermediate barrier layer of the multi-annuli pipe segment to facilitate blocking fluid flow from the inner fitting annulus to the outer fitting annulus;

a vent port formed through the fitting jacket to the outer fitting annulus; and a load transfer ring disposed within the outer fitting annulus to enable the annulus divider ring to be conformally deformed around the intermediate barrier layer of the multi-annuli pipe segment at least in part by transferring from the fitting jacket to the annulus divider ring a portion of swaging force applied to the fitting jacket to conformally deform the fitting jacket around the outer barrier layer of the multi-annuli pipe segment, wherein the load transfer ring comprises:

a central opening that enables the load transfer ring to be disposed around the annulus divider ring; and a fluid opening that enables fluid flow through the load transfer ring to the vent port.

* * * * *